(12) United States Patent
Saito et al.

(10) Patent No.: US 8,420,019 B2
(45) Date of Patent: Apr. 16, 2013

(54) EXHAUST GAS TREATMENT APPARATUS

(75) Inventors: Tomoyuki Saito, Kasumigaura (JP); Toshihiro Abe, Tsukuba (JP); Hiroyuki Kamata, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 337 days.

(21) Appl. No.: 12/810,311

(22) PCT Filed: Mar. 26, 2009

(86) PCT No.: PCT/JP2009/056152
§ 371 (c)(1),
(2), (4) Date: Jun. 24, 2010

(87) PCT Pub. No.: WO2010/004790
PCT Pub. Date: Jan. 14, 2010

(65) Prior Publication Data
US 2010/0269494 A1    Oct. 28, 2010

(30) Foreign Application Priority Data
Jul. 10, 2008    (JP) .................................. 2008-180137

(51) Int. Cl.
*B01D 50/00*    (2006.01)
(52) U.S. Cl.
USPC ......................................................... 422/180
(58) Field of Classification Search .................. 422/177, 422/180
See application file for complete search history.

(56) References Cited

U.S. PATENT DOCUMENTS
6,148,613 A    11/2000    Klopp et al.

FOREIGN PATENT DOCUMENTS

| | | |
|---|---|---|
| JP | 61-272413 A | 12/1986 |
| JP | 6-80815 U | 11/1994 |
| JP | 2001-130156 A | 5/2000 |
| JP | 2000-227020 A | 8/2000 |
| JP | 2001-115821 A | 4/2001 |
| JP | 2001-239336 A | 9/2001 |
| JP | 2003-120277 A | 4/2003 |
| JP | 2005016374 A * | 1/2005 |
| JP | 2006-144738 A | 6/2006 |
| WO | 2006/003713 A1 | 1/2006 |

* cited by examiner

*Primary Examiner* — Tom Duong
(74) *Attorney, Agent, or Firm* — Mattingly & Malur, PC

(57) ABSTRACT

An hydraulic excavator is provided with an exhaust gas treatment apparatus in an exhaust pipe for effecting the purification treatment of exhaust gas including capturing the particulate matter in the exhaust gas. A space provided for mounting and removing a filter accommodating cylinder (31) is formed between the upstream cylinder (22) and the downstream cylinder (27). In particular, upwardly inclined connecting surfaces (23E and 28E) are provided on flange portions of upstream and downstream cylinders (22 and 27), respectively, and downwardly inclined connecting surfaces (32F and 32G) are provided on upstream side flange portions of filter accommodating cylinder (31). In consequence, a substantially V-shaped insertion space (S) which is gradually enlarged from a lower side to an upper side can be formed between the upstream cylinder (22) and the downstream cylinder (27).

8 Claims, 17 Drawing Sheets

EXHAUST GAS TREATMENT APPARATUS

TECHNICAL FIELD

The present invention relates to an exhaust gas treatment apparatus which is suitably used for reducing exhaust noise of exhaust gas emitted from, for example, an engine, and for removing harmful substances contained in the exhaust gas.

BACKGROUND ART

Generally, a construction machine such as a hydraulic excavator is constituted by an automotive lower traveling structure, an upper revolving structure which is swingably mounted on the lower traveling structure, and a working mechanism liftably mounted on the front side of the upper revolving structure. The upper revolving structure has an engine mounted on the rear side of a revolving frame to drive a hydraulic pump, and has a cab, a fuel tank, an operating oil tank, and the like mounted on the front side of the revolving frame.

Generally, a diesel engine is used as the engine of a hydraulic excavator. It is known that the diesel engine emits harmful substances such as particulate matter (PM) and nitrogen oxides (NOx), and the like. Accordingly, the hydraulic excavator is so constructed as to be provided with an exhaust gas treatment apparatus in an exhaust pipe for forming an exhaust gas passage of the engine.

This exhaust gas treatment apparatus has treatment members such as a particulate matter removing filter (generally called a diesel particulate filter, abbreviated as DPF) for capturing and removing the particulate matter in the exhaust gas, a selective reduction catalyst which purifies nitrogen oxides (NOx) by use of a urea water solution, and an oxidation catalyst for oxidizing and removing carbon monoxide (CO) and hydrocarbons (HC) (see, for example, Patent Literature 1: Japanese Patent Laid-Open No. 2003-120277 A).

Here, the exhaust gas treatment apparatus according to Patent Literature 1 is comprised of, for example, an upstream cylinder disposed on an upstream side in the flowing direction of exhaust gas of an engine, a downstream cylinder disposed on the downstream side, and a purifying part cylinder provided in series between these cylinders. And treatment members, including a particulate matter removing filter, an oxidation catalyst, a urea water injection valve, a selective reduction catalyst, and the like, are accommodated in this purifying part cylinder. The upstream cylinder, the purifying part cylinder, and the downstream cylinder respectively have flange-like connecting surfaces substantially perpendicular to the axial direction of the cylinders (longitudinal direction of the cylinders), and are fastened together by using fasteners in a state in which these connecting surfaces are faced to each other with a gasket or the like interposed therebetween. Thus, the exhaust gas treatment apparatus is so constructed as to be mounted on a structure such as the engine provided on the upper revolving structure in the state in which the purifying part cylinder is connected between the upstream cylinder and the downstream cylinder in series in the axial direction.

DISCLOSURE OF THE INVENTION

Incidentally, since the particulate matter removing filter for effecting the purification treatment of exhaust gas captures the particulate matter in the exhaust gas, it is necessary to perform cleaning operation for periodically removing the captured and deposited particulate matter. Here, in performing the cleaning operation of the particulate matter removing filter, in a state in which the upstream cylinder and the downstream cylinder are removed from the purifying part cylinder, the purifying part cylinder is removed from a structure such as the engine, and the particulate matter removing filter accommodated in this purifying part cylinder is taken out to the outside to perform cleaning.

Then, after the particulate matter removing filter for which cleaning has been completed is fitted in the purifying part cylinder, the purifying part cylinder is mounted again to the structure such as the engine, and the upstream cylinder and the downstream cylinder are fitted to the purifying part cylinder.

However, with the above-described exhaust gas treatment apparatus according to Patent Literature 1, the purifying part cylinder with the particulate matter removing filter accommodated therein is mounted to the engine by use of U-bolts and nuts. For this reason, when the purifying part cylinder is removed, it is necessary to remove the U-bolts and nuts fixing the purifying part cylinder to the engine side in a state in which the connecting surfaces of the purifying part cylinder are removed from the connecting surfaces of the upstream cylinder and the downstream cylinder.

As a result, at the time of performing maintenance operation, such as the cleaning operation, inspection operation, and repair operation, with respect to the particulate matter removing filter, time and trouble are required in the operation of mounting and removing the purifying part cylinder incorporating this particulate matter removing filter with respect to the upstream cylinder and the downstream cylinder. Therefore, there is a problem in that the operational efficiency in the maintenance operation declines undesirably.

In view of the above-discussed problems with the prior art, it is an object of the present invention to provide an exhaust gas treatment apparatus which is capable of easily mounting and removing the purifying part cylinder incorporating treatment members from the upstream cylinder and the downstream cylinder, thereby making it possible to enhance the operational efficiency in the maintenance operation with respect to the treatment members.

(1) To overcome the above-described problems, the present invention is applied to an exhaust gas treatment apparatus in accordance with the invention comprising an upstream cylinder provided in an exhaust gas passage of an engine mounted on a vehicle body, a downstream cylinder provided on a downstream side of the upstream cylinder, and a purifying part cylinder which is provided between the upstream cylinder and the downstream cylinder by being detachably connected in series in a direction of an axis of each of the cylinders and in which a treatment member for effecting purification treatment of exhaust gas is incorporated.

Further, a characteristic feature of the present invention lies in that the upstream cylinder, the downstream cylinder, and the purifying part cylinder are provided with flange portions having connecting surfaces which are connected in a mutually opposing state, and that connecting surfaces of the flange portions for connecting the upstream cylinder and the purifying part cylinder and/or connecting surfaces of the flange portions for connecting the downstream cylinder and the purifying part cylinder are formed by inclined connecting surfaces which are inclined diagonally with respect to a direction perpendicular to the direction of the axis of each of the cylinders.

By virtue of this construction, a space can be secured between the upstream cylinder and the downstream cylinder when the purifying part cylinder is mounted to or removed from the upstream cylinder and the downstream cylinder in the direction perpendicular to the axial direction.

Accordingly, when the purifying part cylinder is removed, the purifying part cylinder can be easily removed in the direction perpendicular to the axial direction through the space formed between the upstream cylinder and the downstream cylinder. When the purifying part cylinder is mounted, this purifying part cylinder can be easily inserted between the upstream cylinder and the downstream cylinder. Moreover, when the purifying part cylinder is inserted between the upstream cylinder and the downstream cylinder, the inclined connecting surface(s) of the upstream cylinder and/or the downstream cylinder and the inclined connecting surface(s) of the purifying part cylinder are engaged with each other. In consequence, the purifying part cylinder can be positioned in the axial direction with respect to the upstream cylinder and the downstream cylinder, thereby making it possible to enhance the operational efficiency at the time of mounting the purifying part cylinder.

As a result, it is possible to speedily and easily perform the removal operation of removing the purifying part cylinder from between the upstream cylinder and the downstream cylinder, the maintenance operation including such as the cleaning, inspection, and repair of the treatment member incorporated in this purifying part cylinder, and the mounting operation of remounting the purifying part cylinder between the upstream cylinder and the downstream cylinder. Thus, the operational efficiency with respect to the purifying part cylinder can be enhanced.

(2) In the present invention, the inclined connecting surface(s) provided on the purifying part cylinder are/is configured to be formed as a downwardly inclined connecting surface(s) which are/is inclined diagonally downward, and the inclined connecting surface(s) provided on the upstream cylinder and/or the downstream cylinder are/is configured to be formed as an upwardly inclined connecting surface(s) which are/is inclined diagonally upward.

As a result of this construction, as the purifying part cylinder is inserted from above between the upstream cylinder and the downstream cylinder, the upwardly inclined connecting surface(s) of the upstream cylinder and/or the downstream cylinder and the downwardly inclined connecting surface(s) of the purifying part cylinder can be engaged with each other in the vertical direction. In consequence, since the purifying part cylinder can be held in a positioned state between the upstream cylinder and the downstream cylinder, it is unnecessary to support the purifying part cylinder which is a heavy article when the purifying part cylinder disposed between the upstream cylinder and the downstream cylinder is fastened by use of fasteners or the like, thereby making it possible to speedily and easily perform the operation of mounting and removing this purifying part cylinder.

(3) Meanwhile, in the present invention, the upstream cylinder and the downstream cylinder are arranged to be fixedly mounted in advance so as to set the axis of each of the cylinders in a horizontal direction with respect to the engine and while keeping an insertion space for the purifying part cylinder, and the purifying part cylinder is arranged to be mounted and removed in the direction perpendicular to the direction of the axis of the upstream cylinder and the downstream cylinder.

In consequence, in a state in which the upstream cylinder and the downstream cylinder are fixedly mounted on the engine, it is possible to secure an insertion space for the purifying part cylinder between the upstream cylinder and the downstream cylinder. Therefore, the operation of mounting and removing the purifying part cylinder with respect to the upstream cylinder and the downstream cylinder can be performed smoothly by making use of the insertion space secured between the upstream cylinder and the downstream cylinder.

(4) In the present invention, a construction may be provided such that a positioning pin projecting toward the upstream cylinder is provided on an upstream side flange portion of the purifying part cylinder, and another positioning pin projecting toward the downstream cylinder is provided on a downstream side flange portion thereof, and notched grooves for positioning the purifying part cylinder with respect to the upstream cylinder and the downstream cylinder by causing each of the positioning pins to engage therewith are respectively formed in the flange portion of the upstream cylinder and the flange portion of the downstream cylinder.

By virtue of this construction, if the purifying part cylinder is inserted between the upstream cylinder and the downstream cylinder, the positioning pin provided on the upstream side flange portion of the purifying part cylinder is engaged with the notched groove provided in the flange portion of the upstream cylinder, and the other positioning pin provided on the downstream side flange portion of the purifying part cylinder is engaged with the notched groove provided in the flange portion of the downstream cylinder, thereby making it possible to guide the purifying part cylinder to a proper mounting position with respect to the upstream cylinder and the downstream cylinder. This makes it possible to position the purifying part cylinder so as to be coaxial with the upstream cylinder and the downstream cylinder, thereby making it possible to further enhance the operational efficiency at the time of mounting the purifying part cylinder.

(5) In this instance, in the invention, a construction may be provided such that gaskets are respectively provided between the flange portion of the upstream cylinder and the upstream side flange portion of the purifying part cylinder and between the flange portion of the downstream cylinder and the downstream side flange portion of the purifying part cylinder, pin passage holes through which each of the positioning pins is respectively inserted are respectively provided in each of the gaskets, and in a state in which the pin passage hole of each of the gaskets is fitted over each of the positioning pins, each of the positioning pins is adapted to be respectively engaged with the notched groove in the upstream cylinder and the notched groove in the downstream cylinder.

According to this construction, as the pin passage hole of the gasket is fitted over the positioning pin provided on the upstream side flange portion of the purifying part cylinder, and the pin passage hole of the gasket is fitted over the positioning pin provided on the downstream side flange portion of the purifying part cylinder, the purifying part cylinder can be inserted between the upstream cylinder and the downstream cylinder in a state in which the gaskets are respectively temporarily fixed to the upstream side flange portion and the downstream side flange portion of the purifying part cylinder. Therefore, at the time of performing the operation of connecting the purifying part cylinder between the upstream cylinder and the downstream cylinder, the operation of providing the gasket between the upstream cylinder and the purifying part cylinder and the operation of providing the gasket between the downstream cylinder and the purifying part cylinder can be performed simultaneously, thereby making it possible to enhance the operational efficiency at the time of connecting the purifying part cylinder between the upstream cylinder and the downstream cylinder through the gaskets.

(6) According to the present invention, the treatment member accommodated in the purifying part cylinder is one or a combination of plural pieces of a particulate matter removing filter, an oxidation catalyst, a urea water injection valve, and a selective reduction catalyst.

According to this construction, the purifying part cylinder accommodating therein the treatment member which consists of one or a combination of plural pieces of a particulate matter removing filter, an oxidation catalyst, a urea water injection valve, and a selective reduction catalyst can be easily attached to or detached from the upstream cylinder and the downstream cylinder.

In this instance, the particulate matter removing filter, namely, a treatment member accommodated in the purifying part cylinder, requires periodical cleaning of the captured particulate matter; the urea water injection valve requires the operation of cleaning deposits due to the crystallization of the urea water solution and the operation of inspecting or repairing a defect in the state of injection; and the selective reduction catalyst requires cleaning of deposits due to the precipitation of the urea water solution. However, since the purifying part cylinder is easily detached from the upstream cylinder and the downstream cylinder, it is possible to enhance the operational efficiency in such as the cleaning, inspection, and repair of the particulate matter removing filter, the oxidation catalyst, the urea water injection valve, the selective reduction catalyst, and the like.

(7) According to the present invention, the purifying part cylinder is provided with a placing leg for keeping the purifying part cylinder in a properly placed condition when the purifying part cylinder is removed from between the upstream cylinder and the downstream cylinder and is placed on another location.

Therefore, when the purifying part cylinder is removed from between the upstream cylinder and the downstream cylinder, as the placing leg provided on this purifying part cylinder is placed on another location, it is possible to prevent the purifying part cylinder as a single unit from rolling and keep the purifying part cylinder in a stably placed condition.

(8) Further, according to the present invention, the purifying part cylinder is provided with a grip portion for gripping when the purifying part cylinder is lifted up as a single unit. According to this, when the purifying part cylinder is mounted to or removed from the upstream cylinder and the downstream cylinder, the purifying part cylinder can be lifted up and transported easily and safely by gripping the grip portion provided on the purifying part cylinder.

(9) Furthermore, according to the present invention, a construction may be adopted in which a support leg for mounting through a vibration isolating member to a treatment apparatus supporting bracket provided on the engine is provided on a lower surface side of the upstream cylinder and the downstream cylinder. In consequence, the upstream cylinder and the downstream cylinder can be mounted in a stable state to the treatment apparatus supporting bracket of the engine through the support legs, respectively.

BRIEF DESCRIPTION OF THE DRAWINGS

In the accompanying drawings:
FIG. 8 is an exploded perspective view illustrating the upstream cylinder, a downstream cylinder, a filter accommodating cylinder, and the like;
FIG. 12 is an exploded perspective view similar to FIG. 8 and illustrating the upstream cylinder, the downstream cylinder, the filter accommodating cylinder, positioning pins, notched grooves, and the like.

DESCRIPTION OF REFERENCE NUMERALS

Figure 1:
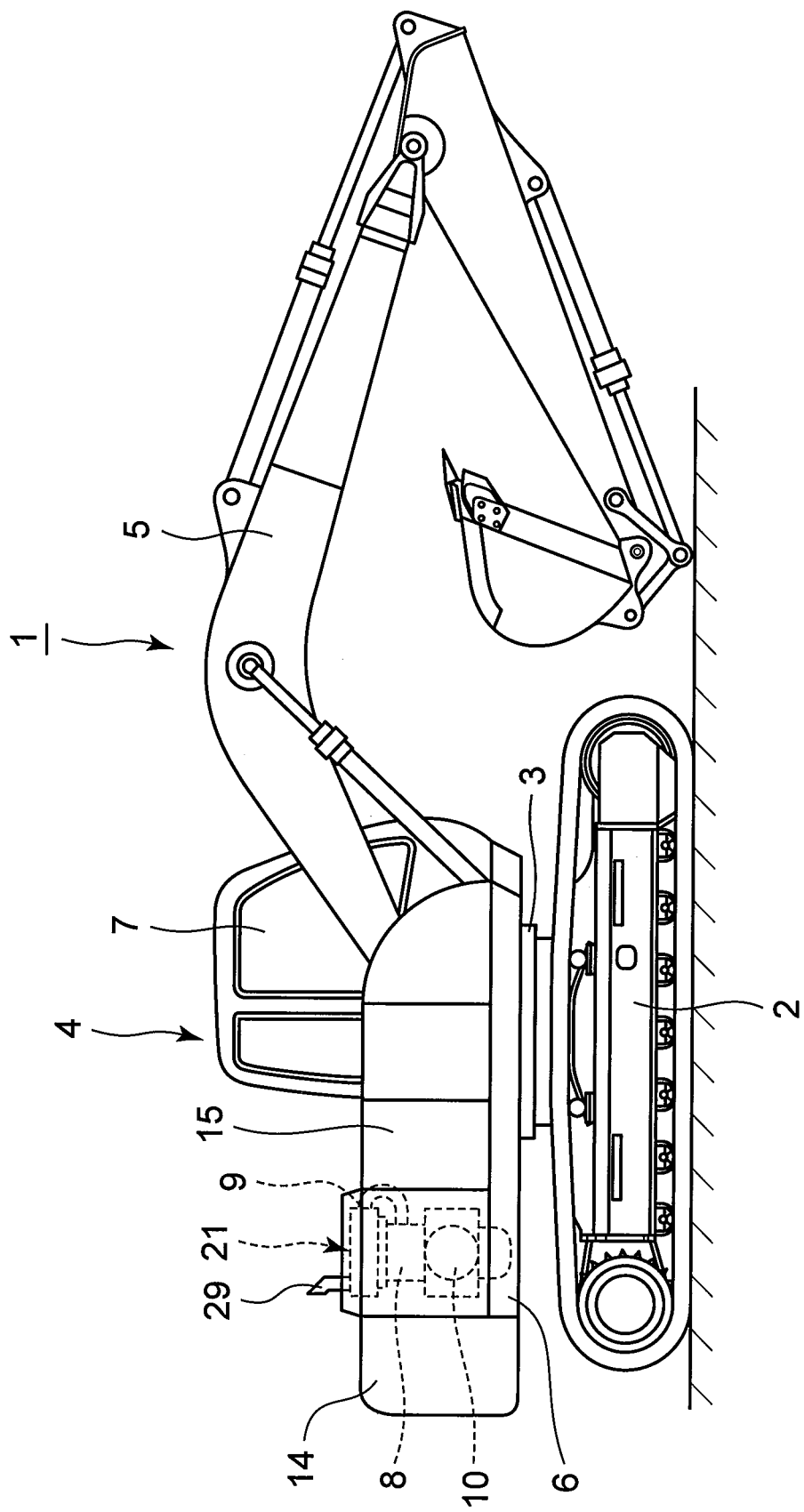
FIG. 1 is a front view illustrating a hydraulic excavator equipped with an exhaust gas treatment apparatus in accordance with a first embodiment of the invention.

1: Hydraulic excavator
2: Lower traveling structure (vehicle body)
4: Upper revolving structure (vehicle body)
8: Engine
9: Exhaust pipe (exhaust gas passage)
21, 51: Exhaust gas treatment apparatus
22: Upstream cylinder
23C, 28C: Flange portion
23E, 28E: Upwardly inclined connecting surface
25: Oxidation catalyst (treatment member)
27, 27': Downstream cylinder
31, 31': Filter accommodating cylinder (purifying part cylinder)
32B, 62A, 32B': Upstream side flange portion
32C, 64A, 32C': Downstream side flange portion
32F, 32G, 62B, 64B, 32F': Downwardly inclined connecting surface 35: Grip portion
36: Placing leg
37: Particulate matter removing filter (DPF) (treatment member)
41: Gasket
41B: Pin passage hole
52, 53: Notched groove
54: Positioning pin
61: Urea water injection valve (treatment member)
62: Injection valve accommodating cylinder (purifying part cylinder)
63: Selective reduction catalyst (treatment member)
64: Reduction catalyst accommodating cylinder (purifying part cylinder)
S: Insertion space

BEST MODE FOR CARRYING OUT THE INVENTION

Hereafter, the embodiments of an exhaust gas treatment apparatus in accordance with the present invention is described more particularly with reference to the accompanying drawings, by citing as an example a case in which the exhaust gas treatment apparatus is applied to a hydraulic excavator.

FIGS. 1 to 9 show a first embodiment of the invention. In this embodiment, a particulate matter removing apparatus (PM removing apparatus) for removing by a particulate matter removing filter (DPF) particulate matter (PM) emitted from an engine is illustrated as an example of the exhaust gas treatment apparatus.

The exhaust gas treatment apparatus used in this embodiment is constructed such that three cylinders, namely, an upstream cylinder with an oxidation catalyst and a muffler accommodated therein, a downstream cylinder with a muffler accommodated therein, and a filter accommodating cylinder with a particulate matter removing filter accommodated therein, are connected together in series in the axial direction of each cylinder by use of bolts, and are mounted to the vehicle body side by means of a placing leg.

In the drawings, designated at 1 is a hydraulic excavator as a typical example of construction machines, and this hydraulic excavator 1 is largely constituted by a crawler type automotive lower traveling structure 2, an upper revolving structure 4 which is swingably mounted on the lower traveling structure 2 through a revolving apparatus 3 and constitutes a vehicle body together with the lower traveling structure 2, and a working mechanism 5 liftably mounted on the front side of the upper revolving structure 4 to perform an excavating operation or the like. The upper revolving structure 4 is constituted by, among others, a revolving frame 6, a cab 7, an engine 8, and an exhaust gas treatment apparatus 21, which will be described hereinafter.

Figure 2:
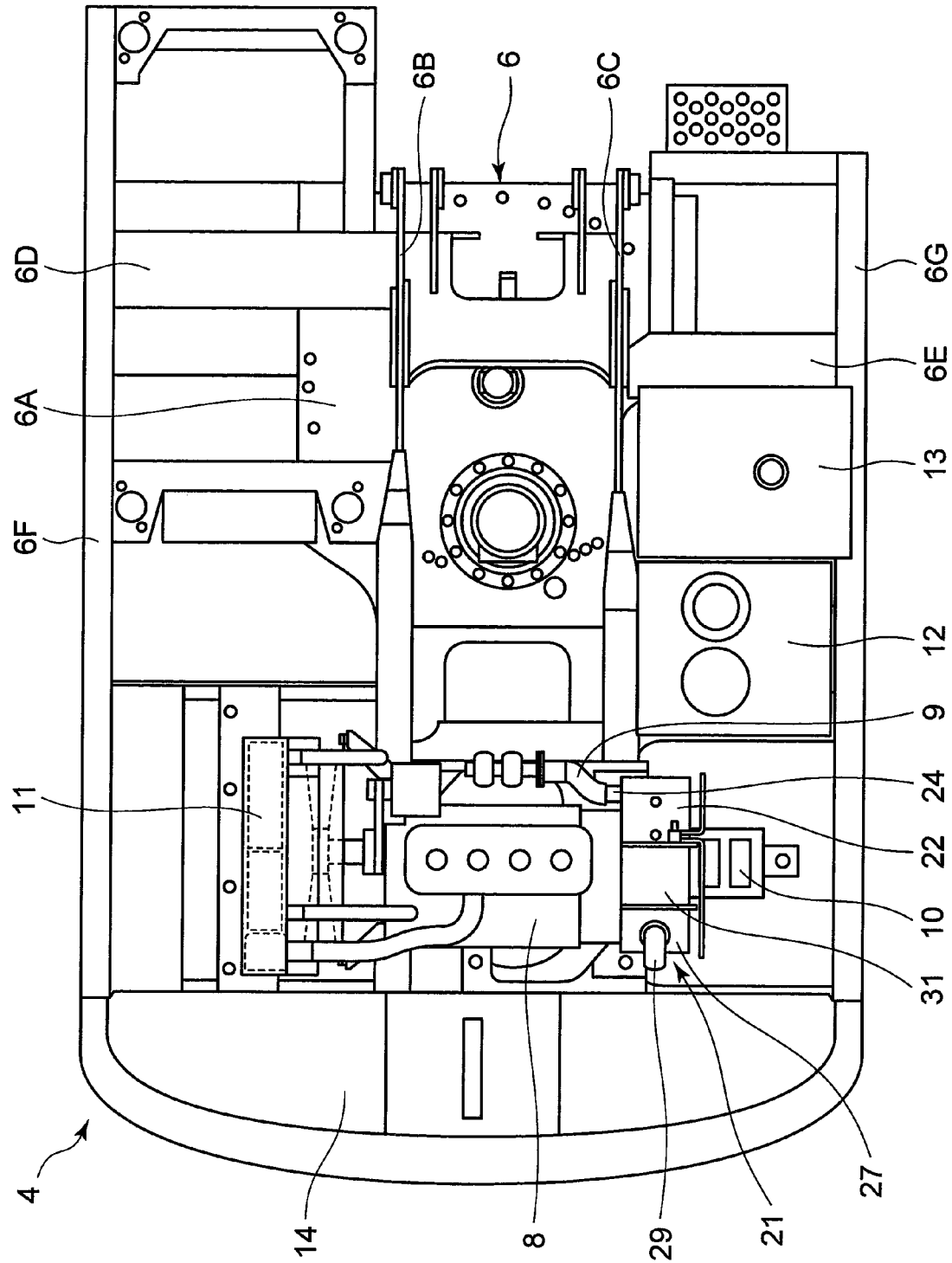
FIG. 2 is a plan view illustrating in enlarged form an upper revolving structure in FIG. 1 with a cab and a housing cover omitted.

Denoted at 6 is the revolving frame serving as a base of the upper revolving structure 4. The revolving frame 6 constitutes a rigid supporting structure and is mounted on the lower traveling structure 2 through the revolving apparatus 3. Here, as shown in FIG. 2, the revolving frame 6 is largely constituted by a thick-walled bottom plate 6A extending in the front-rear direction, a left vertical plate 6B and a right vertical plate 6C erected on the bottom plate 6A and extending in the front-rear direction with a predetermined interval therebetween in the left-right direction, a plurality of left extension beams 6D extending from the left vertical plate 6B in the leftward direction, a plurality of right extension beams 6E extending from the right vertical plate 6C in the rightward direction, a left side frame 6F secured to distal ends of each left extension beam 6D and extending in the front-rear direction, and a right side frame 6G secured to distal ends of each right extension beam 6E and extending in the front-rear direction.

Indicated at 7 is the cab (see FIG. 1) which is mounted on the left front side of the revolving frame 6, and the cab 7 constitutes an operator's operation room. A driver's seat in which the operator is to be seated, various operation levers (none are shown), and the like are disposed inside the cab 7.

Indicated at 8 is the engine which is mounted in a transversely mounted state on the rear side of the revolving frame 6. This engine 8 is constituted by, for example, a diesel engine. As shown in FIG. 2, an exhaust pipe 9, which constitutes a portion of an exhaust gas passage for emitting exhaust gas, is provided on the right side of the engine 8, and the below-described exhaust gas treatment apparatus 21 is mounted at an intermediate portion of the exhaust pipe 9.

The engine 8 is highly efficient and excels in durability, and yet undesirably emits harmful substances such as particulate matter (PM), nitrogen oxides (NOx), and carbon monoxide (CO) together with the exhaust gas. Accordingly, the exhaust gas treatment apparatus 21 which is mounted in the exhaust pipe 9 is comprised of an oxidation catalyst 25 for oxidizing and removing carbon monoxide (CO) and the like and a particulate matter removing filter 37 for capturing and removing particulate matter, as will be described hereinafter.

Figure 3:
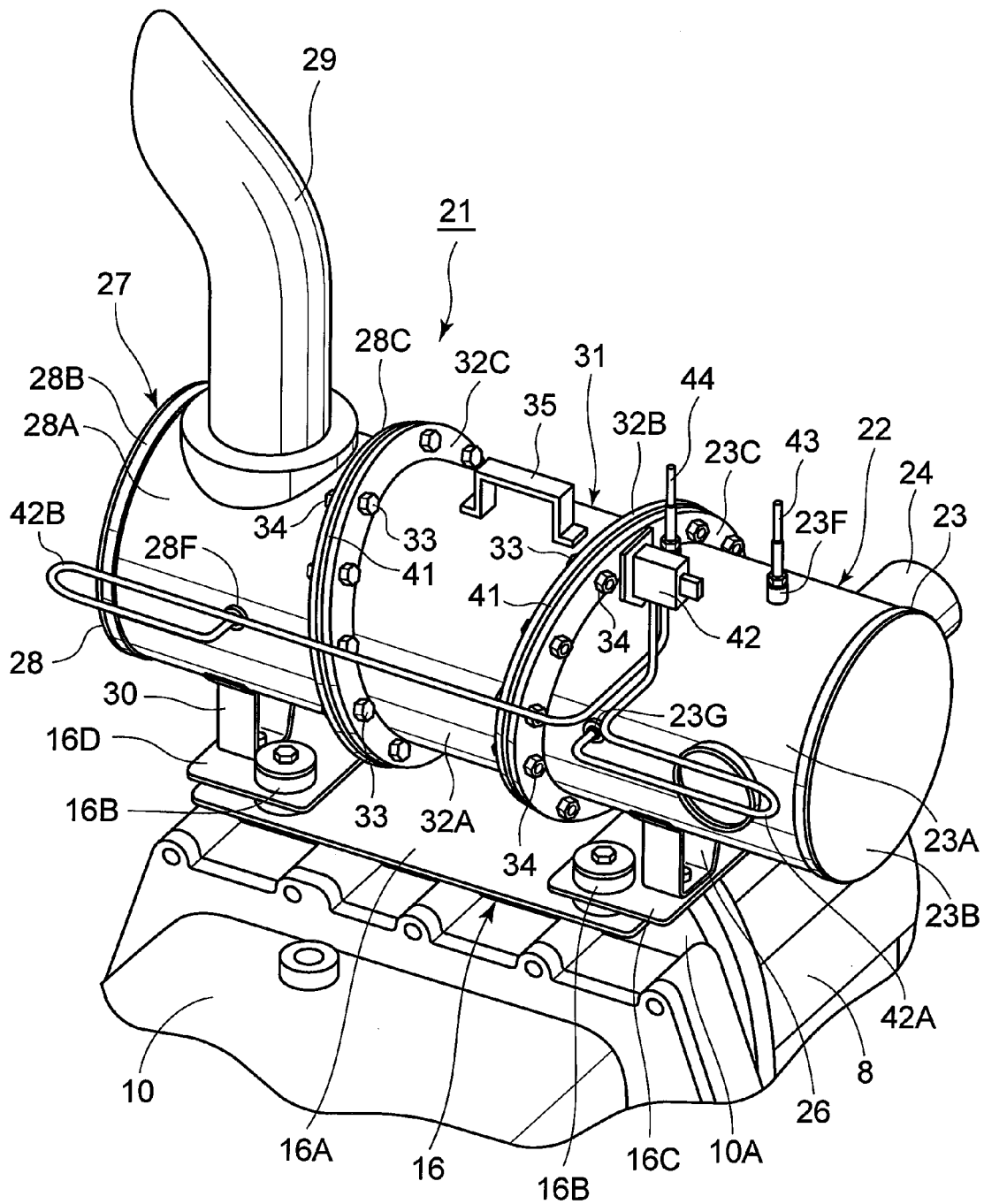
FIG. 3 is an enlarged perspective view of essential portions of the exhaust gas treatment apparatus as mounted on an engine in accordance with the first embodiment.

Indicated at 10 is a hydraulic pump mounted on the right side of the engine 8, and the hydraulic pump 10 is driven by the engine 8 to thereby deliver working pressure oil to various hydraulic actuators mounted on the hydraulic excavator 1. As shown in FIG. 3, as for the hydraulic pump 10, a left end portion opposing the engine 8 serves as a flange portion 10A, and this flange portion 10A is bolted to the engine 8.

Indicated at 11 is heat exchanger provided by being located on the left side of the engine 8, and the heat exchanger 11 is constituted by a radiator, an oil cooler, an intercooler, and the like to radiate the heat into cooling air which is supplied during the operation of the engine 8, thereby cooling engine cooling water, operating oil, and supercharged air.

Indicated at 12 is an operating oil tank which is mounted on the right side of the revolving frame 6 by being located on the front side of the hydraulic pump 10. This operating oil tank 12 stores operating oil which is supplied to the hydraulic pump 10. Further, indicated at 13 is a fuel tank which is provided on the front side of the operating oil tank 12, and this fuel tank 13 stores therein fuel which is supplied to the engine 8.

Indicated at 14 is a counterweight which is mounted on a rear end portion of the revolving frame 6 by being located on the rear side of the engine 8. This counterweight 14 is for keeping a weight balance with the working mechanism 5. Indicated at 15 is a housing cover which is disposed on the front side of the counterweight 14, and the housing cover 15 accommodates the engine 8, the hydraulic pump 10, the heat exchanger 11, and the like.

Figure 4:
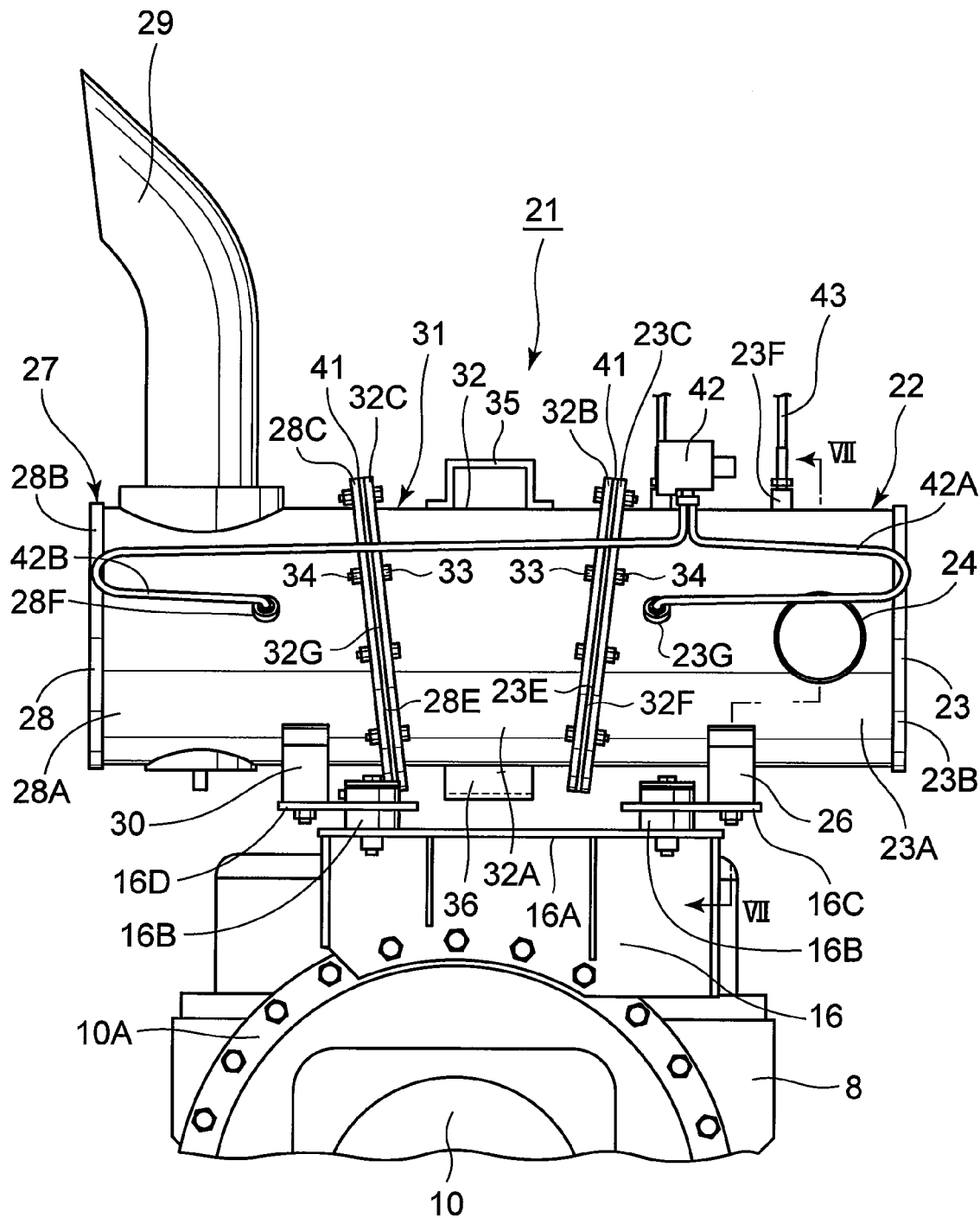
FIG. 4 is a front view illustrating the exhaust gas treatment apparatus together with a hydraulic pump mounted on the engine.
Figure 5:
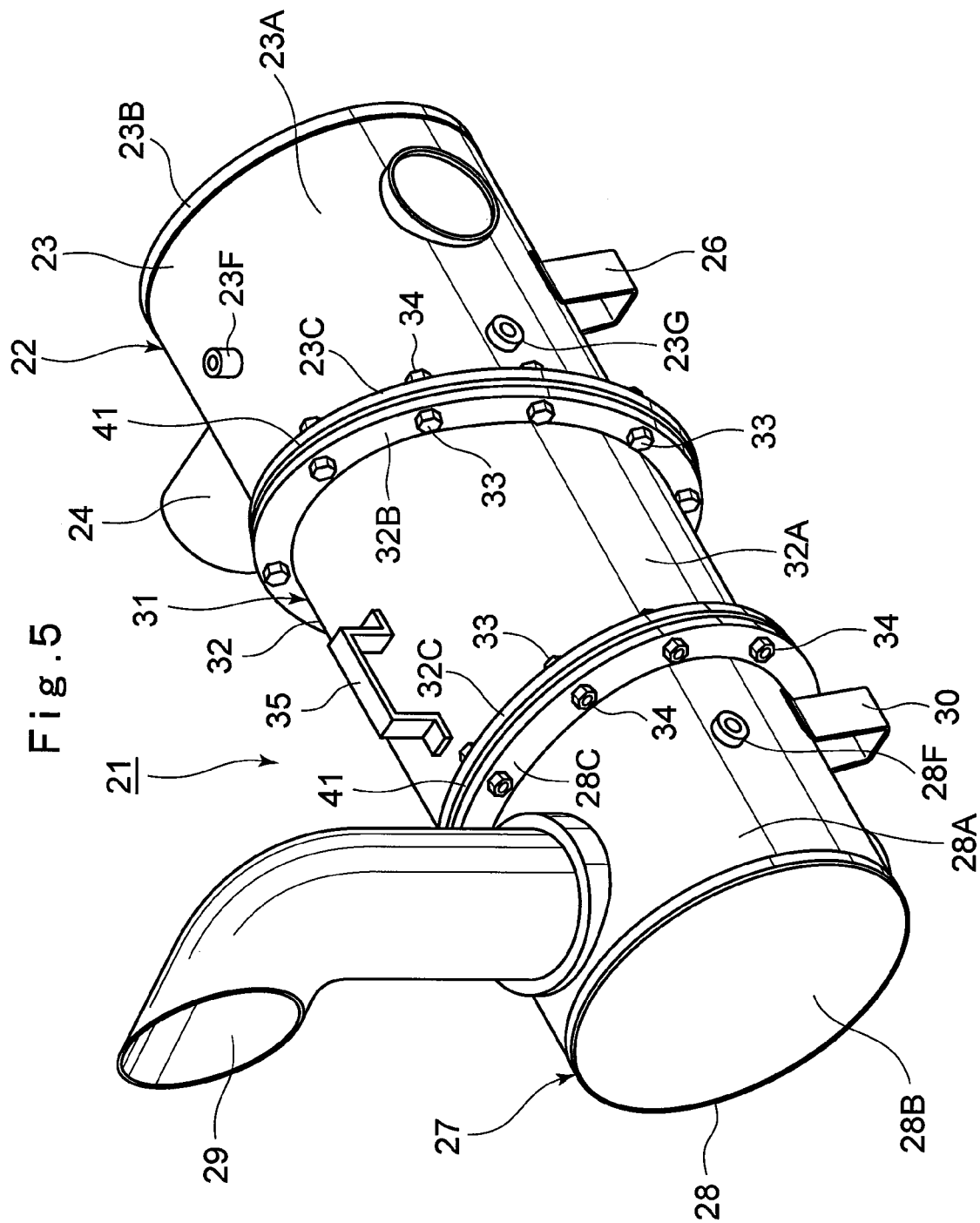
FIG. 5 is a perspective view illustrating the exhaust gas treatment apparatus as a single unit.

Indicated at 16 is a treatment apparatus supporting bracket provided by being located on the right side of the engine 8. The treatment apparatus supporting bracket 16 supports the below-described exhaust gas treatment apparatus 21. As shown in FIGS. 3, 4, and the like, the treatment apparatus supporting bracket 16 is largely constituted by a support base 16A which is mounted on the engine 8 together with the flange portion 10A of the hydraulic pump 10, and a front side mounting plate 16C and a rear side mounting plate 16D which are supported on the support base 16A in a vibration isolated manner through a plurality of vibration isolating members 16B (only two are shown).

Next, a description will be given of the exhaust gas treatment apparatus for purifying the exhaust gas which is emitted from the engine 8.

Designated at 21 is the exhaust gas treatment apparatus located on the upper right side of the engine 8 and connected to the exhaust pipe 9. The exhaust gas treatment apparatus 21 together with the exhaust pipe 9 constitutes an exhaust gas passage to remove harmful substances contained in the exhaust gas. The exhaust gas treatment apparatus 21 is disposed in a longitudinally mounted state (horizontal state) in which it extends in the front-rear direction above the engine 8 so as to set its front side as an upstream side and the rear side as a downstream side in a front-rear direction with respect to the upper revolving structure (see FIG. 2).

As shown in FIGS. 3 to 6, the exhaust gas treatment apparatus 21 is constructed such that three cylinders, namely, an upstream cylinder 22, a downstream cylinder 27, and a filter accommodating cylinder 31 serving as a purifying part cylinder, which will be described hereinafter, are detachably connected in series in a horizontal direction (direction of an axis O-O).

Here, denoted at 22 is the upstream cylinder which is provided on the upstream side of the exhaust gas passage. This upstream cylinder 22 is formed of a lidded cylindrical body for forming an inlet portion for the exhaust gas to flow in. As shown in FIGS. 6 to 9, the upstream cylinder 22 is largely constituted by a cylindrical case 23, an inlet pipe 24, the oxidation catalyst 25, and a support leg 26, which will be described hereinafter.

Indicated at 23 is the cylindrical case for forming an outer shell of the upstream cylinder 22. The cylindrical case 23 is constituted by a cylindrical portion 23A having a large-diameter cylindrical shape, a lid portion 23B provided by closing a front end portion (upstream side) of the cylindrical portion 23A, and a flange portion 23C of an elliptical shape which is provided in the form of a collar over the entire circumference of a rear end portion (downstream side) of the cylindrical portion 23A. A plurality of bolt passage holes 23D are provided in the flange portion 23C at intervals in the circumferential direction.

Figure 9:
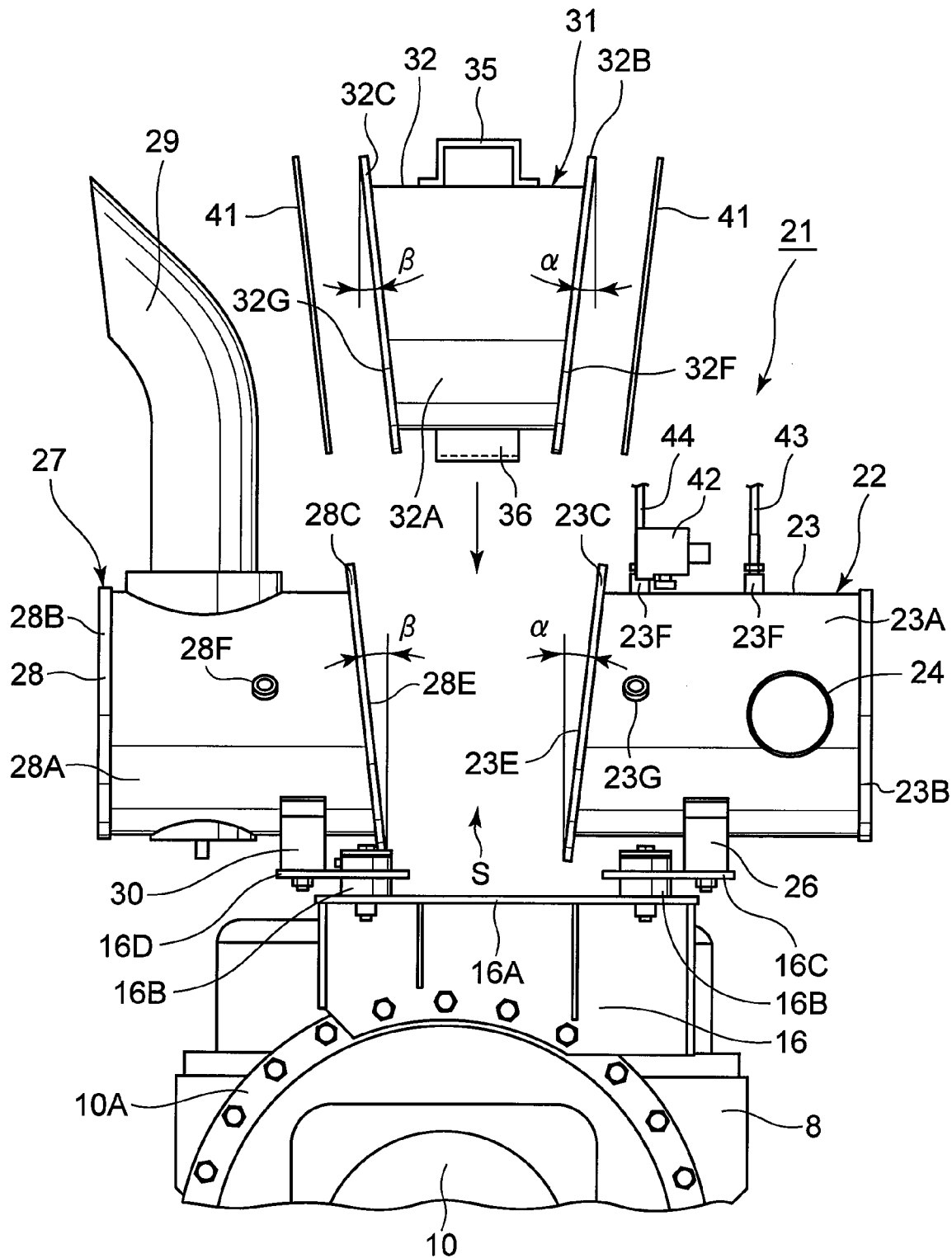
FIG. 9 is a front view illustrating a state of mounting or removing the filter accommodating cylinder with respect to the upstream cylinder and the downstream cylinder.
Figure 10:
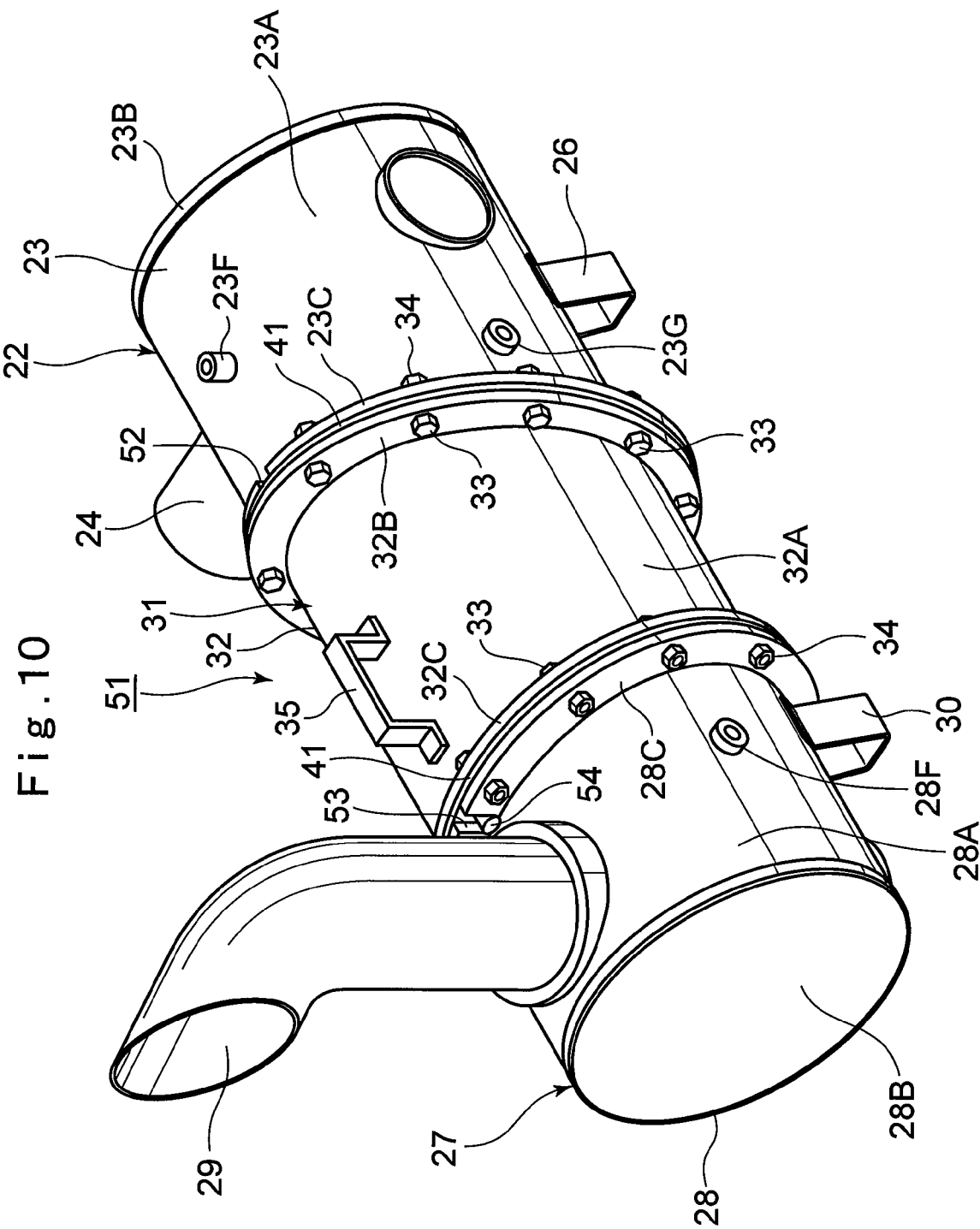
FIG. 10 is a perspective view similar to FIG. 5 and illustrating as a single unit the exhaust gas treatment apparatus in accordance with a second embodiment.
Figure 11:
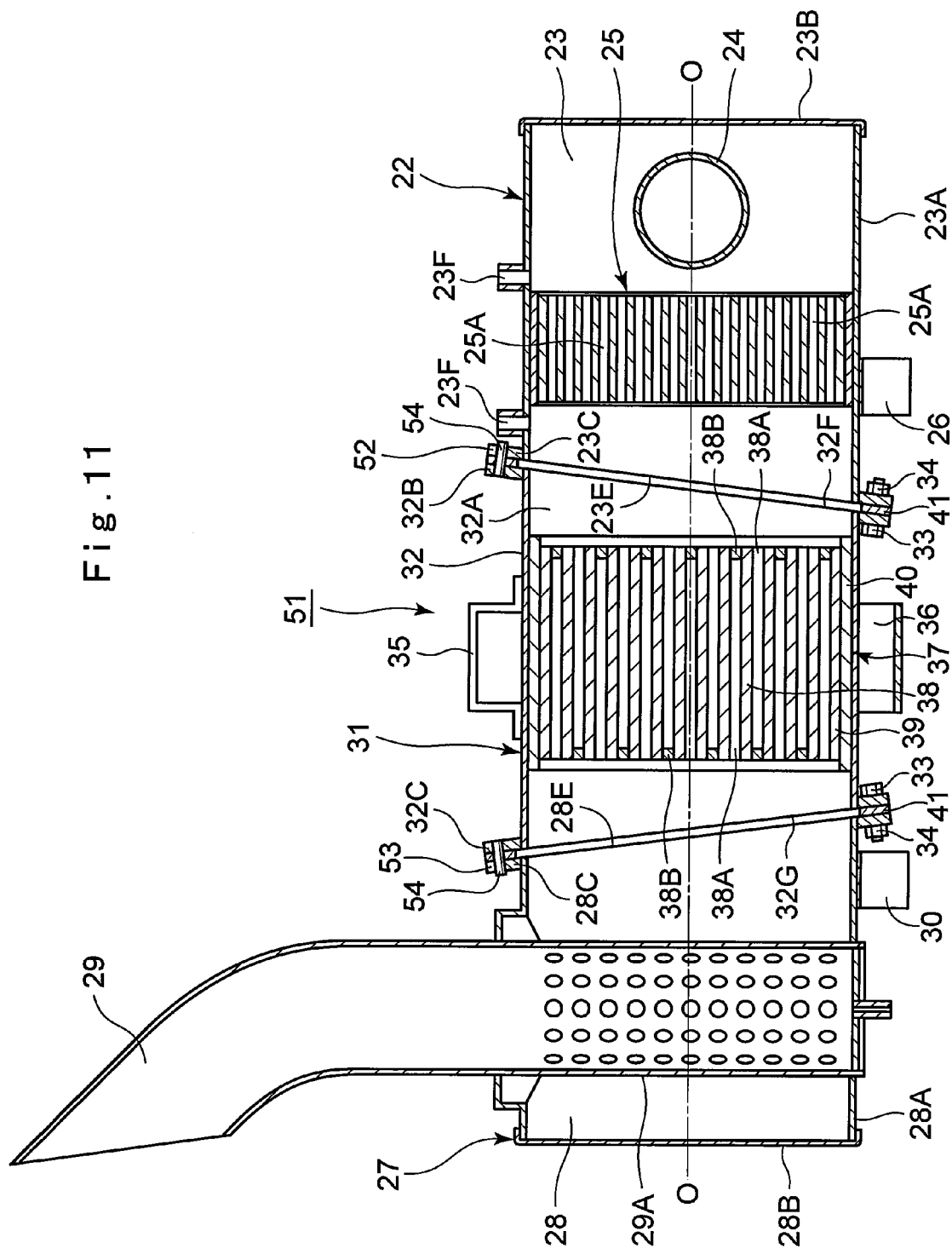
FIG. 11 is a longitudinal sectional view similar to FIG. 6 and illustrating the internal structure of the exhaust gas treatment apparatus.

As shown in FIG. 9, a front end portion of the cylindrical portion 23A is a circular open end extending in a vertical direction perpendicular to the axis O-O, and is closed by the lid portion 23B. Meanwhile, a rear end portion of the cylindrical portion 23A is an inclined open end which is inclined diagonally upward by an angle α with respect to the vertical direction. Accordingly, the cylindrical portion 23A of the cylindrical case 23 is formed such that the size of the upper surface side is small and the size of the lower surface side becomes gradually larger, the open end of the rear end portion of the cylindrical portion 23A being formed in an elliptical shape which is elongated in the vertical direction.

Meanwhile, the flange portion 23C of the cylindrical case 23 is formed as a collar-like body projecting radially outward from the elliptically shaped open end. Therefore, the flange portion 23C is inclined upward by the angle α with respect to the vertical direction in relation to the rear end portion of the cylindrical portion 23A.

An upwardly inclined connecting surface 23E is provided on an outer side surface of the flange portion 23C of the cylindrical case 23. Here, the upwardly inclined connecting surface 23E is inclined diagonally upward by the angle α with respect to the vertical direction. The upwardly inclined connecting surface 23E of the upstream cylinder 22 directly opposes a downwardly inclined connecting surface 32F of the filter accommodating cylinder 31 which will be described hereinafter.

Figure 6:
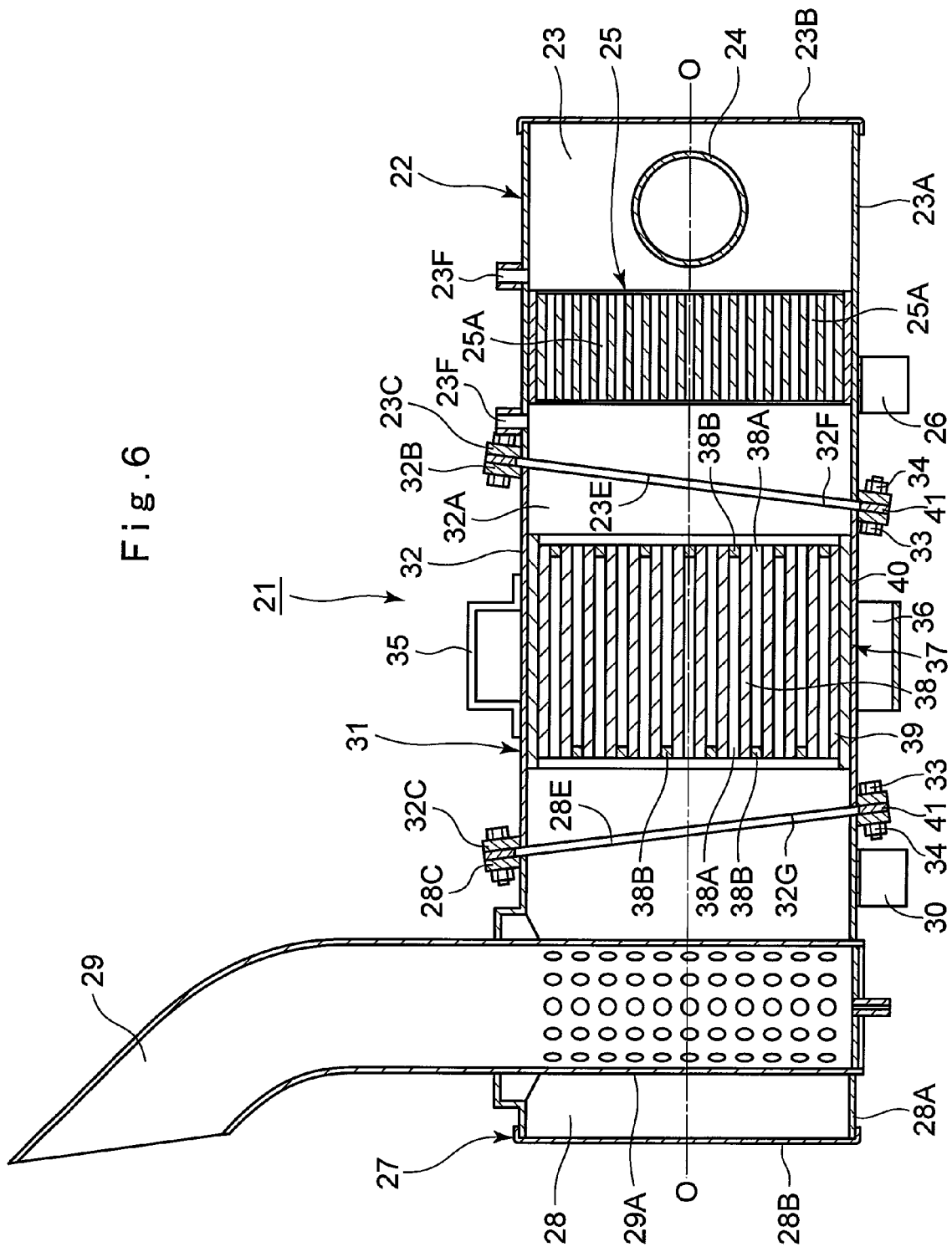
FIG. 6 is a longitudinal sectional view illustrating an internal structure of the exhaust gas treatment apparatus.

As shown in FIG. 6, two temperature sensor mounting ports 23F are provided in the cylindrical case 23 by being located at an upper part of the cylindrical portion 23A. These two temperature sensor mounting ports 23F are for mounting below-described temperature sensors 43 and 44 and are disposed at two locations so as to sandwich the below-described oxidation catalyst 25 in the front-rear direction, as shown in FIGS. 3 and 4. Further, an upstream side pressure delivery portion 23G is provided at a rear side position of the cylindrical portion 23A by being located on the right side, for example, a below-described pressure sensor 42 being arranged to be connected to the pressure delivery portion 23G through upstream side pipe 42A.

Figure 7:
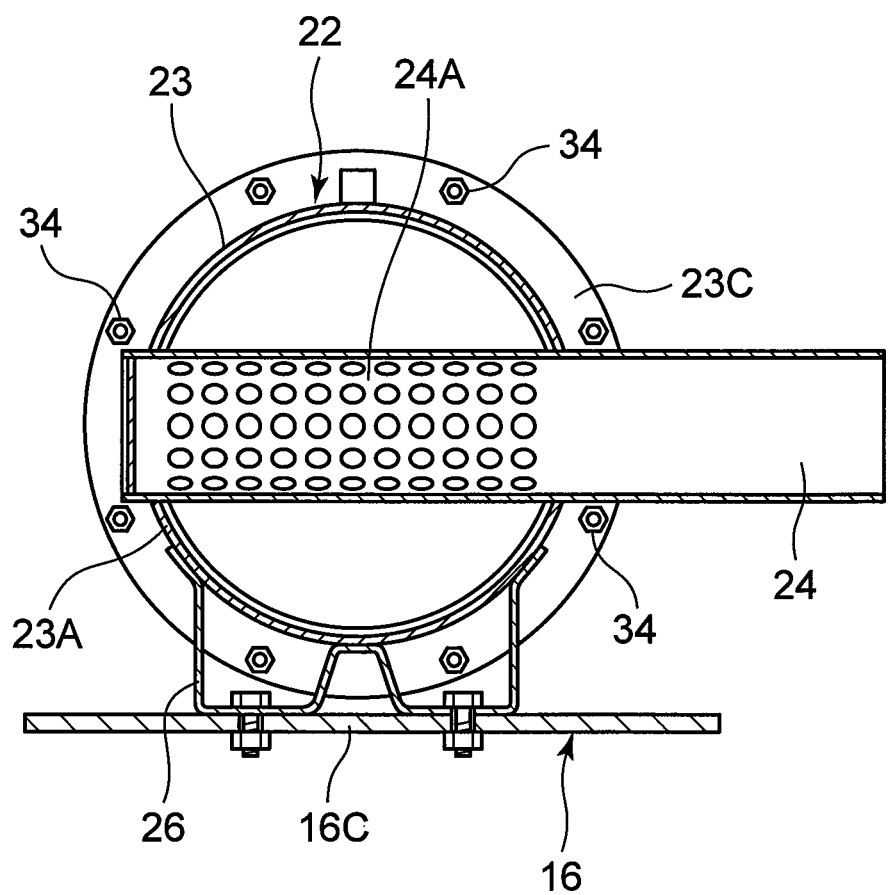
FIG. 7 is an enlarged cross-sectional view, taken from a direction of arrows VII-VII in FIG. 4, of a state in which an upstream cylinder is mounted on a treatment apparatus supporting bracket.

Indicated at 24 is the inlet pipe which is provided on the upstream side (front side of the oxidation catalyst 25) of the cylindrical case 23, and the inlet pipe 24 penetrates the cylindrical portion 23A of the cylindrical case 23 in the radial direction (see FIG. 7). The inlet pipe 24 constitutes a muffler accommodating cylinder 24A inside the cylindrical case 23 so as to reduce exhaust noise.

Figure 8:
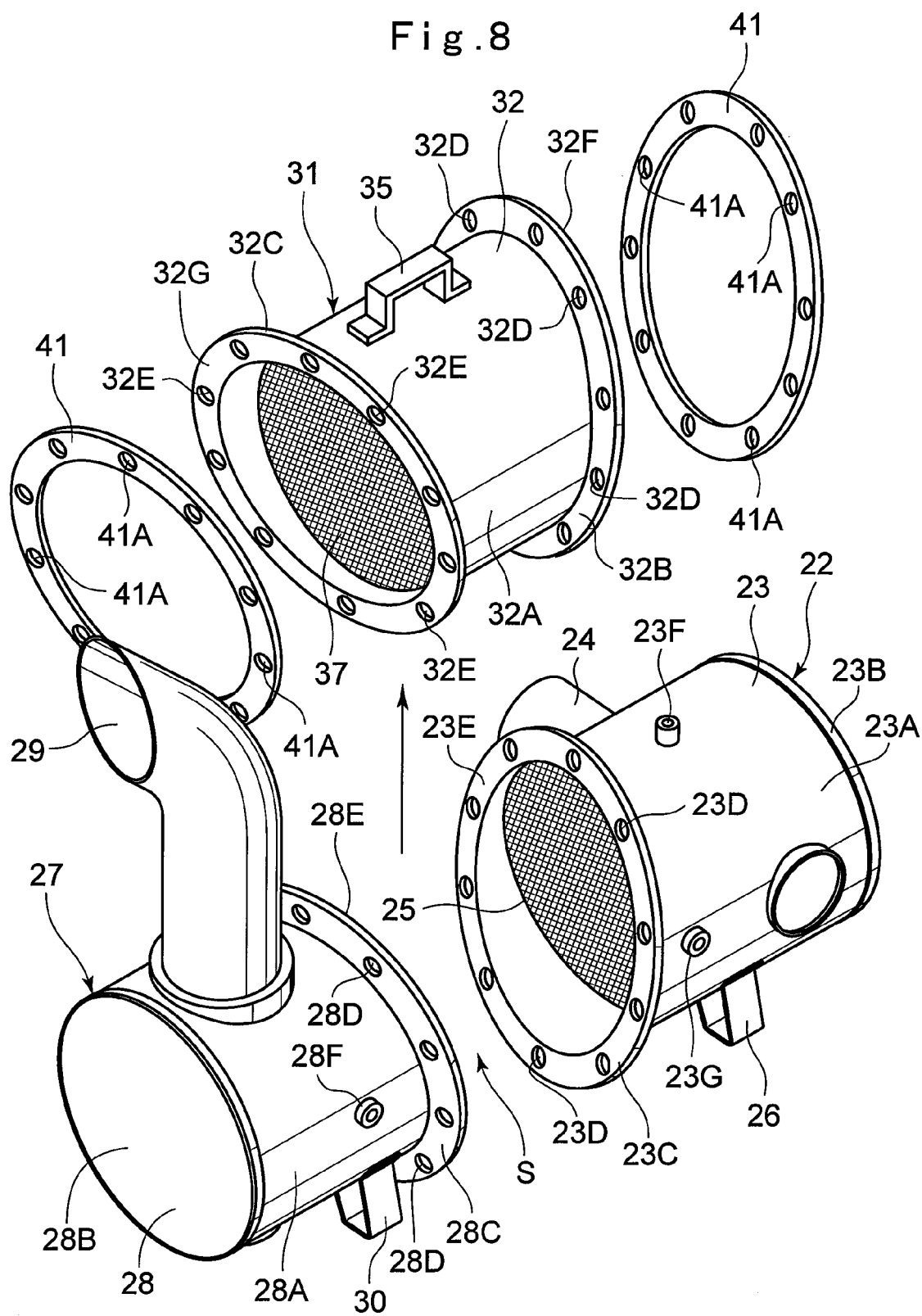

Indicated at 25 is the oxidation catalyst which is accommodated in the cylindrical case 23 by being located on the upstream side of the inlet pipe 24, and the oxidation catalyst 25 constitutes one of treatment members for effecting the purification treatment of exhaust gas. As shown in FIGS. 6 and 8, the oxidation catalyst 25 is formed by a ceramic-made cellular cylindrical body in which a multiplicity of through holes 25A are formed in the axial direction. As the exhaust gas is circulated through each of the through holes 25A, the oxidation catalyst 25 purifies nitrogen oxides (NO), carbon monoxide (CO), hydrocarbons (HC), and the like contained in the exhaust gas.

Indicated at 26 is the support leg which is provided on the lower surface side of the cylindrical case 23 (cylindrical portion 23A), and the support leg 26 is formed by a plate which is bent substantially in a W-shape, as shown in FIG. 7. A lower end side of the support leg 26 is bolted to the front side mounting plate 16C of the treatment apparatus supporting bracket 16.

Next, designated at 27 is the downstream cylinder which is provided on the downstream side of the upstream cylinder 22 with the below-described filter accommodating cylinder 31 sandwiched therebetween. The downstream cylinder 27 is formed of a lidded cylindrical body for forming an outlet portion for the exhaust gas to flow out. As shown in FIGS. 6 and 8, the downstream cylinder 27 is largely constituted by a cylindrical case 28, an outlet pipe 29, and a support leg 30, which will be described hereinafter.

Indicated at 28 is the cylindrical case for forming an outer shell of the downstream cylinder 27. In substantially the same way as the cylindrical case 23 of the upstream cylinder 22, the cylindrical case 28 is constituted by a cylindrical portion 28A having a large-diameter cylindrical shape, a lid portion 28B provided by closing a rear end portion (downstream side) of the cylindrical portion 28A, and a flange portion 28C which is provided in the form of a collar over the entire circumference of a front end portion (upstream side) of the cylindrical portion 28A. A plurality of bolt passage holes 28D are provided in the flange portion 28C at intervals in the circumferential direction.

As shown in FIG. 9, a rear end portion of the cylindrical portion 28A is a circular open end extending in the vertical direction, and is closed by the lid portion 28B. Meanwhile, a front end portion of the cylindrical portion 28A is an inclined open end which is inclined diagonally upward by an angle β with respect to the vertical direction. Accordingly, the cylindrical portion 28A of the cylindrical case 28 is formed such that the size of the upper surface side is small and the size of the lower surface side becomes gradually larger, the open end of the front end portion of the cylindrical portion 28A being formed in an elliptical shape which is elongated in the vertical direction.

Meanwhile, the flange portion 28C of the cylindrical case 28 is formed as a collar-like body projecting radially outward from the elliptically shaped open end. Therefore, the flange portion 28C is inclined at the front end portion of the cylindrical portion 28A upwardly by the angle β with respect to the vertical direction.

An upwardly inclined connecting surface 28E is provided on the flange portion 28C of the cylindrical case 28. The upwardly inclined connecting surface 28E is inclined diagonally upward by the angle β with respect to the vertical direction. The upwardly inclined connecting surface 28E of the downstream cylinder 27 directly opposes a downwardly inclined connecting surface 32G of the filter accommodating cylinder 31 which will be described hereinafter.

A downstream side pressure delivery portion 28F is provided at a rear side position of the cylindrical portion 28A by being located on the right side, for example, and the below-described pressure sensor 42 is arranged to be connected to the pressure delivery portion 28F through downstream side pipe 42B.

Indicated at 29 is the outlet pipe which is called a tail pipe provided on the rear side (downstream side) of the cylindrical case 28, and the outlet pipe 29 penetrates the cylindrical portion 28A of the cylindrical case 28 in the radial direction (see FIG. 6). An upper end side of the outlet pipe 29 projecting from the cylindrical case 28 projects upwardly of the housing cover 15 shown in FIG. 1, and is open to the atmosphere. The outlet pipe 29 constitutes a muffler accommodating cylinder 29A inside the cylindrical case 28 so as to reduce exhaust noise.

Indicated at 30 is the support leg serving as a support member which is provided on the lower surface side of the cylindrical case 28 (cylindrical portion 28A). In the same way as the support leg 26 of the upstream cylinder 22, the support leg 30 is formed by a plate which is bent substantially in a W-shape. A lower end side of the support leg 30 is bolted to the rear side mounting plate 16D of the treatment apparatus supporting bracket 16.

Next, denoted at 31 is a filter accommodating cylinder connected in series in the horizontal direction between the upstream cylinder 22 and the downstream cylinder 27. This filter accommodating cylinder 31 constitutes a purifying part cylinder incorporating a treatment member for effecting the purification treatment of exhaust gas. As shown in FIGS. 6 to 9, the filter accommodating cylinder 31 is formed of a cylindrical body with both ends open, and is largely constituted by a cylindrical case 32 and the particulate matter removing filter 37, which will be described hereinafter.

Indicated at 32 is the cylindrical case for forming an outer shell of the filter accommodating cylinder 31, and the cylindrical case 32 accommodates the particulate matter removing filter 37 therein. The cylindrical case 32 is largely constituted by a cylindrical portion 32A having an outer diameter dimension substantially equal to those of the cylindrical case 23 of the upstream cylinder 22 and the cylindrical case 28 of the downstream cylinder 27, an upstream side flange portion 32B provided in the form of a collar over the entire circumference of a front end portion (upstream side) of the cylindrical portion 32A, and a downstream side flange portion 32C of provided in the form of a collar over the entire circumference of a rear end portion (downstream side) of the cylindrical portion 32A. A plurality of bolt passage holes 32D are provided in the upstream side flange portion 32B at positions corresponding to the bolt passage holes 23D of the cylindrical case 23 constituting the upstream cylinder 22, while a plurality of bolt passage holes 32E are provided in the downstream side flange portion 32C at positions corresponding to the bolt passage holes 28D of the cylindrical case 28 constituting the downstream cylinder 27.

As shown in FIG. 9, a front end portion of the cylindrical portion 32A, which is connected to the cylindrical case 23 of the upstream cylinder 22, is inclined diagonally downward by the angle α with respect to the vertical direction. A rear end portion of the cylindrical portion 32A, which is connected to the cylindrical case 28 of the downstream cylinder 27, is inclined diagonally downward by the angle β with respect to the vertical direction. Accordingly, the cylindrical portion 32A of the cylindrical case 32 is formed such that the size of the upper surface side is large and the size of the lower surface side becomes gradually smaller, open ends at both end portions of the cylindrical portion 32A being each formed in an elliptical shape which is elongated in the vertical direction.

Meanwhile, the upstream side flange portion 32B of the cylindrical case 32 is formed as a collar-like body projecting radially outward from the elliptically shaped open end. Therefore, the upstream side flange portion 32B is inclined at the front end portion of the cylindrical portion 32A downwardly by the angle α with respect to the vertical direction.

The downstream side flange portion 32C of the cylindrical case 32 is formed as a collar-like body projecting radially outward from the elliptically shaped open end. Therefore, the downstream side flange portion 32C is inclined at the rear end portion of the cylindrical portion 32A downwardly by the angle β with respect to the vertical direction.

Further, the upstream side downwardly inclined connecting surface 32F is provided on the upstream side flange portion 32B of the cylindrical case 32. The downwardly inclined connecting surface 32F is inclined diagonally downward by the angle α with respect to the vertical direction. The downwardly inclined connecting surface 32F directly opposes the upwardly inclined connecting surface 23E provided on the flange portion 23C of the upstream cylinder 22.

In case of mounting the cylindrical case 32 to the upstream cylinder 22, the downwardly inclined connecting surface 32F provided on the upstream side flange portion 32B is directly opposed through a below-described gasket 41 to the upwardly inclined connecting surface 23E provided on the flange portion 23C of the cylindrical case 23 constituting the upstream cylinder 22. In this state, bolts 33 are inserted into the bolt passage holes 32D of the upstream side flange portion 32B and each of the bolt passage holes 23D of the flange portion 23C, and nuts 34 are threadedly engaged with these bolts 33. In consequence, the upstream side flange portion 32B of the filter accommodating cylinder 31 and the flange portion 23C of the upstream cylinder 22 are arranged to be fastened together.

Further, the downstream side downwardly inclined connecting surface 32G is provided on the downstream side flange portion 32C of the cylindrical case 32. The downwardly inclined connecting surface 32G is inclined diagonally downward by the angle β with respect to the vertical direction. The downwardly inclined connecting surface 32G directly opposes the upwardly inclined connecting surface 28E provided on the flange portion 28C of the downstream cylinder 27.

In case of mounting the cylindrical case 32 to the downstream cylinder 27, the downwardly inclined connecting surface 32G provided on the downstream side flange portion 32C is directly opposed through a gasket 41 to the upwardly inclined connecting surface 28E provided on the flange portion 28C of the cylindrical case 28 constituting the downstream cylinder 27. In this state, bolts 33 are inserted into the bolt passage holes 32E of the downstream side flange portion 32C and each of the bolt passage holes 28D of the flange portion 28C, and nuts 34 are threadedly engaged with these bolts 33. In consequence, the downstream side flange portion 32C of the filter accommodating cylinder 31 and the flange portion 28C of the downstream cylinder 27 are arranged to be fastened together.

Thus, the upwardly inclined connecting surface 23E which is inclined diagonally upward by the angle α with respect to the vertical direction is provided on the flange portion 23C of the upstream cylinder 22, and the upwardly inclined connecting surface 28E which is inclined diagonally upward by the angle β with respect to the vertical direction is provided on the flange portion 28C of the downstream cylinder 27. As a result, as shown in FIG. 9, the interval becomes gradually larger from the lower side toward the upper side between the upwardly inclined connecting surface 23E of the upstream cylinder 22 and the upwardly inclined connecting surface 28E of the downstream cylinder 27, so that a substantially V-shaped insertion space S into which the filter accommodating cylinder 31 is inserted is formed.

Accordingly, the construction provided is such that it is possible to secure a large space at the time of mounting the filter accommodating cylinder 31 from above between the upstream cylinder 22 and the downstream cylinder 27, and it is possible to secure a large space at the time of upwardly removing the filter accommodating cylinder 31 connected between the upstream cylinder 22 and the downstream cylinder 27.

Further, the downwardly inclined connecting surface 32F which is inclined diagonally downward by the angle α with respect to the vertical direction is provided on the upstream side flange portion 32B of the filter accommodating cylinder 31, and the downwardly inclined connecting surface 32G which is inclined diagonally downward by the angle β with respect to the vertical direction is provided on the downstream side flange portion 32C. As a result, when the filter accommodating cylinder 31 is mounted or removed, the downwardly inclined connecting surface 32F can be engaged with the upwardly inclined connecting surface 23E of the upstream cylinder 22, and the downwardly inclined connecting surface 32G of the filter accommodating cylinder 31 can be engaged with the upwardly inclined connecting surface 28E of the downstream cylinder 27.

Thus, the construction provided is such that the filter accommodating cylinder 31 can be aligned with the upstream cylinder 22 and the downstream cylinder 27 in the horizontal direction (direction of the axis O-O), and the filter accommodating cylinder 31 can be held in a temporarily fixed state between the upstream cylinder 22 and the downstream cylinder 27.

Indicated at 35 is a grip portion which is provided on the cylindrical case 32 of the filter accommodating cylinder 31, and the grip portion 35 is for gripping at the time of lifting up the filter accommodating cylinder 31 as a single unit. Here, the grip portion 35 is formed by bending, for example, a flat steel plate substantially into a U-shape, and is secured to the upper surface side of the cylindrical portion 32A of the cylindrical case 32 by using welding or other similar means.

Indicated at 36 is a placing leg which is provided on the cylindrical case 32 of the filter accommodating cylinder 31. The placing leg 36 is formed by bending, for example, a flat steel plate substantially into a U-shape, and is secured to the lower surface side of the cylindrical portion 32A of the cylindrical case 32 by using welding or other similar means. The arrangement provided is such that when the filter accommodating cylinder 31 removed from between the upstream cylinder 22 and the downstream cylinder 27 is placed on another location such as a workbench (not shown), the placing leg 36 is abutted against the workbench, thereby making it possible to prevent the filter accommodating cylinder 31 having the cylindrical shape from rolling on the workbench and hold the filter accommodating cylinder 31 in a stably placed condition.

Designated at 37 is the particulate matter removing filter (generally called a diesel particulate filter, this filter 37 being hereinafter abbreviated as the "DPF 37") accommodated in the cylindrical case 32. This DPF 37 is a typical example of treatment members used in exhaust gas treatment apparatuses, and is a specific example of the treatment member in this first embodiment. As shown in FIG. 6, the DPF 37 is largely constituted by a filter body 38 formed into a cylindrical shape by a porous member such as a ceramic material, a buffer material layer 39 provided on the outer peripheral side of the filter body 38 over the entire circumference, and a heat insulating layer 40 provided on the outer peripheral side of the buffer material layer 39 over the entire circumference.

The filter body 38 has a cellular cylindrical body of a honeycomb structure provided with a multiplicity of small diameter passages 38A along the direction of the axis O-O, and contiguously alternate and different end portions of the small diameter passages 38A are each closed by a sealing member 38B. As the exhaust gas flowing into each of the small diameter passages 38A from the upstream side is passed through the porous material, the filter body 38 captures particulate matters and causes the exhaust gas alone to flow out to the downstream side through the adjacent small diameter passages 38A.

In this instance, the particulate matter captured by the filter body 38 is burned and removed, but part of it gradually deposited in the small diameter passages 38A as ashes. In addition, other unburnt residues such as heavy metals, calcium, and the like in engine oil are also gradually deposited. Accordingly, the arrangement provided is such that the pressure on the upstream side of the DPF 37 and the pressure on the downstream side thereof are measured by the below-described pressure sensor 42, and when a pressure difference between the upstream side and the downstream side has reached a predetermined value, the DPF 37 is removed from the cylindrical case 32 of the filter accommodating cylinder 31 so as to clean the deposits.

Indicated at 41 are the gaskets which are respectively provided between the cylindrical case 23 of the upstream cylinder 22 and the cylindrical case 32 of the filter accommodating cylinder 31 and between the cylindrical case 28 of the downstream cylinder 27 and the cylindrical case 32 of the filter accommodating cylinder 31. As shown in FIGS. 6 and 8, each of the gaskets 41 is formed as an annular body substantially similar to each of the upstream side flange portion 32B and the downstream side flange portion 32C of the cylindrical case 32 by using a metal plate such as a stainless steel plate. Further, a plurality of bolt passage holes 41A corresponding to each of the bolt passage holes 32D and 32E of the upstream side flange portion 32B and the downstream side flange portion 32C are formed in each of the gaskets 41.

Denoted at 42 is the pressure sensor which is provided on the outer peripheral side of the upstream cylinder 22, and the pressure sensor 42 detects pressures of (pressure difference between) the upstream side and the downstream side of the DPF 37 so as to estimate the amount of deposits of the particulate matter, unburnt residues, and the like. The pressure sensor 42 has its upstream side pipe 42A connected to the pressure delivery portion 23G at the cylindrical case 23 of the upstream cylinder 22 and its downstream side pipe 42B connected to the pressure delivery portion 28F at the cylindrical case 28 of the downstream cylinder 27.

Indicated at 43 is the upstream side temperature sensor provided on the upstream side of the cylindrical case 23 of the upstream cylinder 22, and the upstream side temperature sensor 43 is mounted at the temperature sensor mounting port 23F located on the upstream side of the cylindrical case 23, and is connected to a controller (not shown). Further, the upstream side temperature sensor 43 is for detecting the temperature of the exhaust gas flowing into the cylindrical case 23, so as to confirm whether or not the temperature is such as to allow the oxidation catalyst 25 to function.

Indicated at 44 is the downstream side temperature sensor provided on the downstream side of the cylindrical case 23 of the upstream cylinder 22. This downstream side temperature sensor 44 is for detecting the temperature of the exhaust gas which has passed through the oxidation catalyst 25, so as to confirm whether or not the oxidation (regeneration) of the particulate matter captured by the DPF 37 is possible.

The exhaust gas treatment apparatus 21 in accordance with the first embodiment has the above-described construction, and a description will next be given of a mounting procedure for mounting the exhaust gas treatment apparatus 21 to the treatment apparatus supporting bracket 16.

First, as shown in FIG. 9, the front side mounting plate 16C is mounted on the support base 16A of the treatment apparatus supporting bracket 16 by means of the vibration isolating members 16B, and the rear side mounting plate 16D is mounted thereon by means of the vibration isolating members 16B. In this state, the upstream cylinder 22 is disposed on the front side mounting plate 16C, and the support leg 26 provided on the cylindrical case 23 of the upstream cylinder 22 is bolted to the front side mounting plate 16C. The downstream cylinder 27 is disposed on the rear side mounting plate 16D, and the support leg 30 provided on the cylindrical case 28 of the downstream cylinder 27 is bolted to the rear side mounting plate 16D.

In this instance, the flange portion 23C of the cylindrical case 23 constituting the upstream cylinder 22 is inclined diagonally upward by the angle α with respect to the vertical direction, while the flange portion 28C of the cylindrical case 28 constituting the downstream cylinder 27 is inclined diagonally upward by the angle β with respect to the vertical direction. In consequence, the upstream cylinder 22 and the downstream cylinder 27 are fixedly mounted in advance to the treatment apparatus supporting bracket 16 in a state in which the axis O-O of each of the cylinders 22 and 27 is set in the horizontal direction with respect to the engine 8, and the substantially V-shaped insertion space S for the insertion of the filter accommodating cylinder 31 is maintained therebetween.

In this state, the filter accommodating cylinder 31 is inserted into the insertion space between the upstream cylinder 22 and the downstream cylinder 27 from the vertical direction of each of the cylinders 22 and 27. Then, the downwardly inclined connecting surface 32F provided on the upstream side flange portion 32B of the filter accommodating cylinder 31 is engaged through the gasket 41 with the upwardly inclined connecting surface 23E provided on the flange portion 23C of the upstream cylinder 22, and the downwardly inclined connecting surface 32G provided on the downstream side flange portion 32C of the filter accommodating cylinder 31 is engaged through the gasket 41 with the upwardly inclined connecting surface 28E provided on the flange portion 28C of the downstream cylinder 27.

Then, the upstream side flange portion 32B of the filter accommodating cylinder 31 and the flange portion 23C of the upstream cylinder 22 are fastened by use of the bolts 33 and the nuts 34, and the downstream side flange portion 32C of the filter accommodating cylinder 31 and the flange portion 28C of the downstream cylinder 27 are fastened by use of the bolts 33 and the nuts 34. In consequence, the exhaust gas treatment apparatus 21 can be mounted on the treatment apparatus supporting bracket 16 in the state in which the upstream cylinder 22, the downstream cylinder 27, and the filter accommodating cylinder 31 are connected in series in the horizontal direction.

Next, a description will be given of the exhaust gas treatment operation using the exhaust gas treatment apparatus 21 thus mounted.

When the engine 8 is started to perform an excavating operation or the like by the hydraulic excavator 1, exhaust gas containing harmful substances such as particulate matter, nitrogen oxides, and the like is emitted from the engine 8 through the exhaust pipe 9, and this exhaust gas is introduced into the exhaust gas treatment apparatus 21 through the inlet pipe 24.

At this time, when the exhaust gas passes through the oxidation catalyst 25 accommodated in the upstream cylinder 22, the exhaust gas treatment apparatus 21 oxidizes and removes carbon monoxide (CO), hydrocarbons (HC), and the like contained in this exhaust gas. Further, when the exhaust gas which passed through the oxidation catalyst 25 passes through the DPF 37 accommodated in the filter accommodating cylinder 31, particulate matter contained in the exhaust gas is captured by the filter body 38 of this DPF 37. The captured particulate matter is burned (regenerated) and removed by setting the exhaust gas to a high temperature.

Thus, the particulate matter captured by the filter body 38 of the DPF 37 is burned and removed, but part of it is reduced to ashes and is gradually deposited in the small diameter passages 38A of the filter body 38. In addition, other unburnt residues, such as heavy metals, calcium, and the like in engine oil, are also gradually deposited.

For this reason, a pressure difference between the pressure on the upstream side of the DPF 37 and the pressure on the downstream side thereof is measured by the pressure sensor 42, and when this pressure difference has reached a predetermined value, it is necessary to remove the DPF 37 from the cylindrical case 32 of the filter accommodating cylinder 31 and clean the deposits.

Accordingly, a description will be given of the cleaning operation for removing the particulate matter deposited in the DPF 37.

In performing this cleaning operation, each of the bolts 33 and the nuts 34 are removed from the flange portion 23C of the upstream cylinder 22 and the upstream side flange portion 32B of the filter accommodating cylinder 31, and each of the bolts 33 and the nuts 34 are removed from the flange portion 28C of the downstream cylinder 27 and the downstream side flange portion 32C of the filter accommodating cylinder 31.

In this state, as shown in FIG. 9, the operator holds the grip portion 35 provided on the filter accommodating cylinder 31 and lifts the filter accommodating cylinder 31 upward. In consequence, the filter accommodating cylinder 31 and the gasket 41 can be removed upward with respect to the upstream cylinder 22 and the downstream cylinder 27 in the state in which the upstream cylinder 22 and the downstream cylinder 27 are mounted as they are on the treatment apparatus supporting bracket 16.

In this instance, the upwardly inclined connecting surface 23E, which is inclined diagonally upward by the angle α with respect to the vertical direction, is provided on the flange portion 23C of the upstream cylinder 22, and the upwardly inclined connecting surface 28E, which is inclined diagonally upward by the angle β with respect to the vertical direction, is provided on the flange portion 28C of the downstream cylinder 27. For this reason, the insertion space S which is formed between the upwardly inclined connecting surface 23E of the upstream cylinder 22 and the upwardly inclined connecting surface 28E of the downstream cylinder 27 becomes gradually larger from the lower side toward the upper side so as to be substantially V-shaped.

Accordingly, since it is possible to secure a large space at the time of removing the filter accommodating cylinder 31 upwardly from between the upstream cylinder 22 and the downstream cylinder 27, the filter accommodating cylinder 31 and each of the gaskets 41 can be easily removed upwardly, so that its operational efficiency can be enhanced.

Moreover, the downwardly inclined connecting surface 32F, which is inclined diagonally downward by the angle α with respect to the vertical direction, is provided on the upstream side flange portion 32B of the filter accommodating cylinder 31, and the downwardly inclined connecting surface 32G, which is inclined diagonally downward by the angle β with respect to the vertical direction, is provided on the downstream side flange portion 32C thereof. Meanwhile, the downwardly inclined connecting surface 32F of the filter accommodating cylinder 31 is engaged from above with the upwardly inclined connecting surface 23E of the upstream cylinder 22 through the gasket 41, and the downwardly inclined connecting surface 32G of the filter accommodating cylinder 31 is engaged from above with the upwardly inclined connecting surface 28E of the downstream cylinder 27 through the gasket 41.

Accordingly, the filter accommodating cylinder 31 and each of the gaskets 41 can be held in a temporarily fixed state (positioned state) between the upstream cylinder 22 and the downstream cylinder 27.

For this reason, at the time of removing each of the bolts 33 and the nuts 34 for fastening the upstream cylinder 22, the downstream cylinder 27, and the filter accommodating cylinder 31, it is unnecessary to support the filter accommodating cylinder 31 which is a heavy article, so that the operational efficiency at the time of removing the filter accommodating cylinder 31 from between the upstream cylinder 22 and the downstream cylinder 27 can be further enhanced.

Thus, the filter accommodating cylinder 31 can be singly removed upward with respect to the upstream cylinder 22 and the downstream cylinder 27. Therefore, even in cases where the exhaust gas treatment apparatus 21 is disposed in a narrow space within the housing cover 15 together with mounted equipment such as the engine 8, the hydraulic pump 10, and the like, the operator is able to remove only the filter accommodating cylinder 31 safely and easily without being hampered by other mounted equipments.

Further, it is possible to clean the DPF 37 by blowing compressed air by using, for instance, an air spray gun onto the filter body 38 of the DPF 37 accommodated in the filter accommodating cylinder 31 to remove ashes of the particulate matter and unburnt residues deposited in the small diameter passages 38A.

Here, in a case where the filter accommodating cylinder 31 is placed as a single unit on another location such as a workbench (not shown) to perform the cleaning of the DPF 37, the placing leg 36 secured to the lower surface side of the filter accommodating cylinder 31 (cylindrical case 32) is placed on the workbench. Thereby, it is possible to prevent the filter accommodating cylinder 31 having the cylindrical shape from rolling on the workbench and keep the filter accommodating cylinder 31 placed on the workbench in a stably placed condition.

After the DPF 37 is thus cleaned, the filter accommodating cylinder 31 with this DPF 37 accommodated therein is mounted again between the upstream cylinder 22 and the downstream cylinder 27.

In the case where the operation of mounting the filter accommodating cylinder 31, as shown in FIG. 9, in the state in which the gaskets 41 are disposed in the vicinities of the upstream side flange portion 32B and the downstream side flange portion 32C of the filter accommodating cylinder 31, the filter accommodating cylinder 31 and each of the gaskets 41 are inserted from above between the upstream cylinder 22 and the downstream cylinder 27.

In this instance, since the substantially V-shaped insertion space S, which is gradually enlarged from the lower side toward the upper side, is formed between the upwardly inclined connecting surface 23E provided on the flange portion 23C of the upstream cylinder 22 and the upwardly inclined connecting surface 28E provided on the flange portion 28C of the downstream cylinder 27. It is possible to secure a large space at the time of inserting the filter accommodating cylinder 31 and each of the gaskets 41 from above between the upstream cylinder 22 and the downstream cylinder 27.

In this state, the downwardly inclined connecting surface 32F, which is provided on the upstream side flange portion 32B of the filter accommodating cylinder 31, is engaged with the upwardly inclined connecting surface 23E of the upstream cylinder 22 through the gasket 41, and the downwardly inclined connecting surface 32G, which is provided on the downstream side flange portion 32C of the filter accommodating cylinder 31, is engaged with the upwardly inclined connecting surface 28E of the downstream cylinder 27 through the gasket 41. The filter accommodating cylinder 31 and each of the gaskets 41 are thereby held in a temporarily fixed state between the upstream cylinder 22 and the downstream cylinder 27.

Then, the upstream side flange portion 32B of the filter accommodating cylinder 31, the gasket 41, and the flange portion 23C of the upstream cylinder 22 are fastened by use of the bolts 33 and the nuts 34, and the downstream side flange portion 32C of the filter accommodating cylinder 31, the gasket 41, and the flange portion 28C of the downstream cylinder 27 are fastened by use of the bolts 33 and the nuts 34. In consequence, the filter accommodating cylinder 31 can be fastened to the upstream cylinder 22 and the downstream cylinder 27 through the gaskets 41, respectively, allowing the filter accommodating cylinder 31 to be connected between the upstream cylinder 22 and the downstream cylinder 27 in series in the horizontal direction.

In this case, when the filter accommodating cylinder 31 and each of the gaskets 41 are disposed between the upstream cylinder 22 and the downstream cylinder 27, the downwardly inclined connecting surface 32F of the upstream side flange portion 32B of the filter accommodating cylinder 31 is engaged from above with the upwardly inclined connecting surface 23E of the flange portion 23C of the upstream cylinder 22 through the gaskets 41, and the downwardly inclined connecting surface 32G of the downstream side flange portion 32C of the filter accommodating cylinder 31 is engaged from above with the upwardly inclined connecting surface 28E of the flange portion 28C of the downstream cylinder 27 through the gaskets 41.

In consequence, the filter accommodating cylinder 31 and each of the gaskets 41 can be reliably positioned in the horizontal direction between the upstream cylinder 22 and the downstream cylinder 27. As a result, it is possible to enhance the operational efficiency at the time of fastening the filter accommodating cylinder 31 to the upstream cylinder 22 and the downstream cylinder 27 by use of the bolts 33 and the nuts 34.

As such, according to this embodiment, the construction provided is such that the upwardly inclined connecting surface 23E is provided on the flange portion 23C of the upstream cylinder 22, and the upwardly inclined connecting surface 28E is provided on the flange portion 28C of the downstream cylinder 27, while the downwardly inclined connecting surface 32F is provided on the upstream side flange portion 32B of the filter accommodating cylinder 31, and the downwardly inclined connecting surface 32G is provided on the downstream side flange portion 32C thereof. In consequence, the substantially V-shaped insertion space S, which is gradually enlarged from the lower side toward the upper side, can be formed between the upwardly inclined connecting surface 23E of the upstream cylinder 22 and the upwardly inclined connecting surface 28E of the downstream cylinder 27.

Therefore, it is possible to secure a large space at the time of removing the filter accommodating cylinder 31 upwardly from between the upstream cylinder 22 and the downstream cylinder 27, so that the filter accommodating cylinder 31 and each of the gaskets 41 can be easily removed upwardly. In addition, it is possible to secure a large insertion space S at the time of inserting the filter accommodating cylinder 31 from above between the upstream cylinder 22 and the downstream cylinder 27, so that the filter accommodating cylinder 31 can be easily mounted between the upstream cylinder 22 and the downstream cylinder 27.

Moreover, as the downwardly inclined connecting surface 32F of the filter accommodating cylinder 31 is engaged from above with the upwardly inclined connecting surface 23E of the flange portion 23C of the upstream cylinder 22, and the downwardly inclined connecting surface 32G of the filter accommodating cylinder 31 is engaged from above with the upwardly inclined connecting surface 28E of the downstream cylinder 27, the filter accommodating cylinder 31 can be reliably held in a positioned state (temporarily fixed state) between the upstream cylinder 22 and the downstream cylinder 27. For this reason, at the time of fastening, on the one hand, each of the upstream cylinder 22 and the downstream cylinder 27 and, on the other hand, the filter accommodating cylinder 31 by using the plurality of bolts 33 and nuts 34, or removing the plurality of bolts 33 and nuts 34 fastening, on the one hand, each of the upstream cylinder 22 and the downstream cylinder 27 and, on the other hand, the filter accommodating cylinder 31, it is unnecessary to support the filter accommodating cylinder 31 which is a heavy article, so that it is possible to enhance the operational efficiency at the time of fastening or removing each of the bolts 33 and the nuts 34.

As a result, it is possible to speedily and easily perform the removal operation of removing the filter accommodating cylinder 31 from between the upstream cylinder 22 and the downstream cylinder 27, the maintenance operation including such as cleaning, inspection, and repair with respect to the DPF 37 incorporated in this filter accommodating cylinder 31, and the mounting operation of remounting the filter accommodating cylinder 31 between the upstream cylinder 22 and the downstream cylinder 27. Thus, the operational efficiency at the time of performing these operations can be enhanced.

Next, FIGS. 10 to 17 show a second embodiment of the invention, and the characteristic feature of this embodiment lies in that positioning pins are respectively provided on the upstream side flange portion and the downstream side flange portion of the purifying part cylinder, and notched grooves are respectively provided in the flange portion of the upstream cylinder and the flange portion of the downstream cylinder. In this embodiment, the component elements that are identical to those of the foregoing first embodiment will be simply denoted by the same reference numerals to avoid repetitions of similar explanations.

In the drawings, designated at 51 is an exhaust gas treatment apparatus in accordance with the second embodiment, and this exhaust gas treatment apparatus 51 is largely constituted by the upstream cylinder 22, the downstream cylinder 27, and the filter accommodating cylinder 31 in substantially the same way as the exhaust gas treatment apparatus 21 in accordance with the above-described first embodiment.

However, the exhaust gas treatment apparatus 51 in accordance with the second embodiment is so constructed that a below-described notched groove 52 is provided in the flange portion 23C of the cylindrical case 23 constituting the upstream cylinder 22, a below-described notched groove 53 is provided in the flange portion 28C of the cylindrical case 28 constituting the downstream cylinder 27, and below-described positioning pins 54, 54 are respectively provided in the upstream side flange portion 32B and the downstream side flange portion 32C of the cylindrical case 32 constituting the filter accommodating cylinder 31. Accordingly, in the second embodiment, the exhaust gas treatment apparatus 51 differs from the exhaust gas treatment apparatus 21 in accordance with the first embodiment in that the notched grooves 52 and 53 and the positioning pins 54, 54 are provided.

Figure 12:
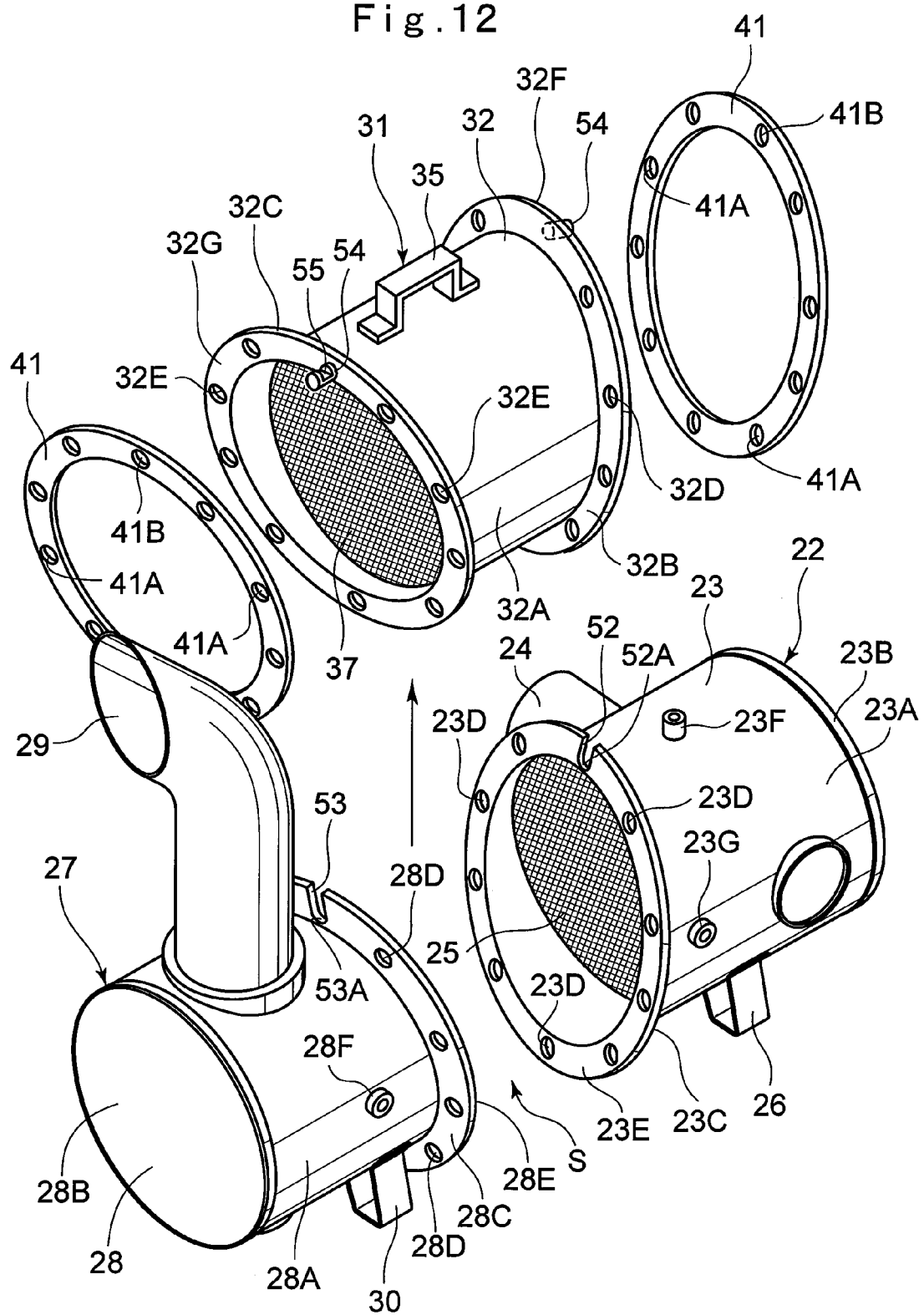

Indicated at 52 is the notched groove provided in the flange portion 23C of the cylindrical case 23, constituting the upstream cylinder 22. The below-described positioning pin 54 provided on the upstream side flange portion 32B of the filter accommodating cylinder 31 is engaged with this notched groove 52. As shown in FIG. 12, the notched groove 52 is formed as a single vertical groove extending linearly in the vertical direction by notching an upper end side of the flange portion 23C from its outer peripheral edge portion toward the center, and its lower end portion is formed as a groove bottom 52A.

As the positioning pin 54 of the filter accommodating cylinder 31 is engaged with the notched groove 52, the notched groove 52 guides the filter accommodating cylinder 31 in the radial direction with respect to the upstream cylinder 22, and in a state in which the positioning pin 54 abuts against the groove bottom 52A of the notched groove 52, the filter accommodating cylinder 31 is positioned so as to be coaxial with the upstream cylinder 22.

Indicated at 53 is the notched groove provided in the flange portion 28C of the cylindrical case 28 which constitutes the downstream cylinder 27. The below-described positioning pin 54 provided on the downstream side flange portion 32C of the filter accommodating cylinder 31 is engaged with this notched groove 53, and the notched groove 53 directly opposes in the front-rear direction the notched groove 52 provided in the flange portion 23C of the upstream cylinder 22. As shown in FIG. 12, the notched groove 53 is also formed as a single vertical groove extending linearly in the vertical direction by notching an upper end side of the flange portion 28C from its outer peripheral edge portion toward the center, and its lower end portion is formed as a groove bottom 53A.

As the positioning pin 54 of the filter accommodating cylinder 31 is engaged with the notched groove 53, the notched groove 53 guides the filter accommodating cylinder 31 in the radial direction with respect to the downstream cylinder 27, and in a state in which the positioning pin 54 abuts against the groove bottom 53A of the notched groove 53, the filter accommodating cylinder 31 is positioned so as to be coaxial with the downstream cylinder 27.

Designated at 54 are the positioning pins which are each provided on each of the upstream side flange portion 32B and the downstream side flange portion 32C of the cylindrical case 32 which constitutes the filter accommodating cylinder 31. These positioning pins 54 hold the gaskets 41 and are engaged with the notched groove 52 provided in the flange portion 23C of the upstream cylinder 22 and the notched groove 53 provided in the flange portion 28C of the downstream cylinder 27.

Here, each of the positioning pins 54 is constituted by a columnar pin of a slightly smaller diameter than the groove width of each of the above-described notched grooves 52 and 53, and the positioning pins 54 are respectively secured to the upstream side flange portion 32B and the downstream side flange portion 32C by using, for example, press fitting means. Further, the positioning pin 54 provided on the upstream side flange portion 32B projects from the downwardly inclined connecting surface 32F toward the upstream cylinder 22, while the other positioning pin 54 provided on the downstream side flange portion 32C projects from the downwardly inclined connecting surface 32G toward the downstream cylinder 27.

As shown in FIG. 12, one of the plurality of bolt passage holes 41A provided in the gasket 41 is formed as a pin passage hole 41B into which the positioning pin 54 is inserted. As the positioning pin 54 is inserted in this pin passage hole 41B, the positioning pin 54 is adapted to be engaged with the respective one of the notched groove 52 of the upstream cylinder 22 and the notched groove 53 of the downstream cylinder 27 in the state in which the gasket 41 is held by the positioning pin 54.

Figure 14:
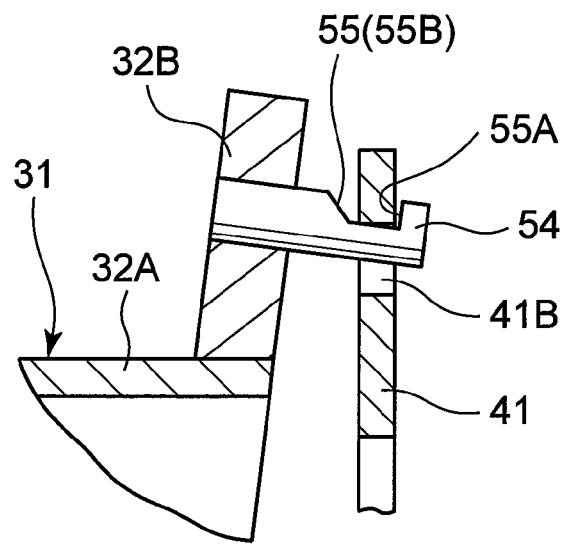
FIG. 14 is an enlarged cross-sectional view of essential portions illustrating a state in which a gasket is fitted over the positioning pin of the filter accommodating cylinder.
Figure 15:
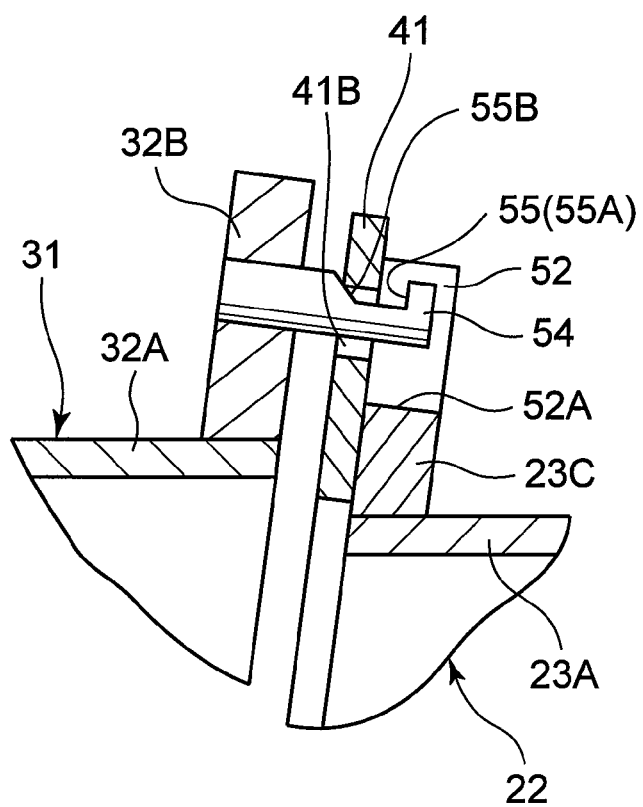
FIG. 15 is an enlarged cross-sectional view of essential portions illustrating a state in which the positioning pin of the filter accommodating cylinder is engaged with the notched groove in the upstream cylinder.
Figure 16:
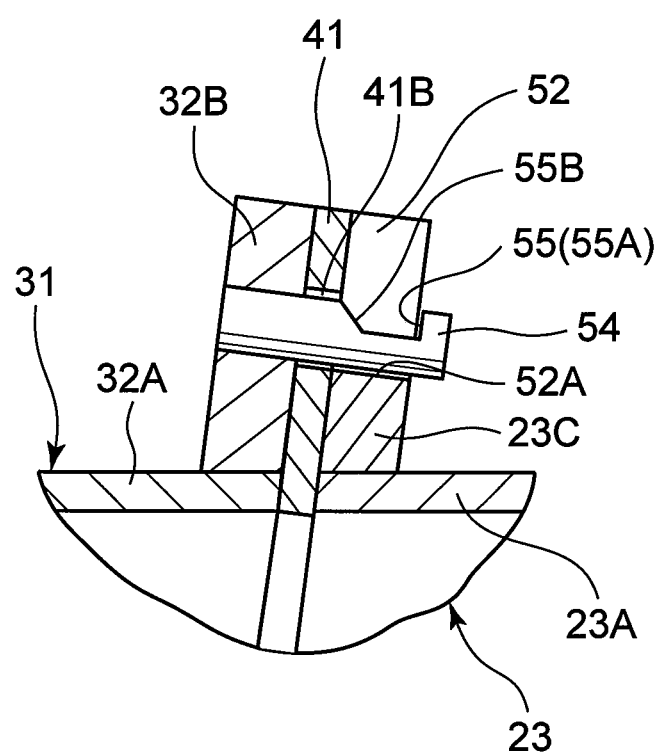
FIG. 16 is an enlarged cross-sectional view of essential portions illustrating a state in which the positioning pin of the filter accommodating cylinder abuts against a groove bottom of the notched groove.
Figure 17:
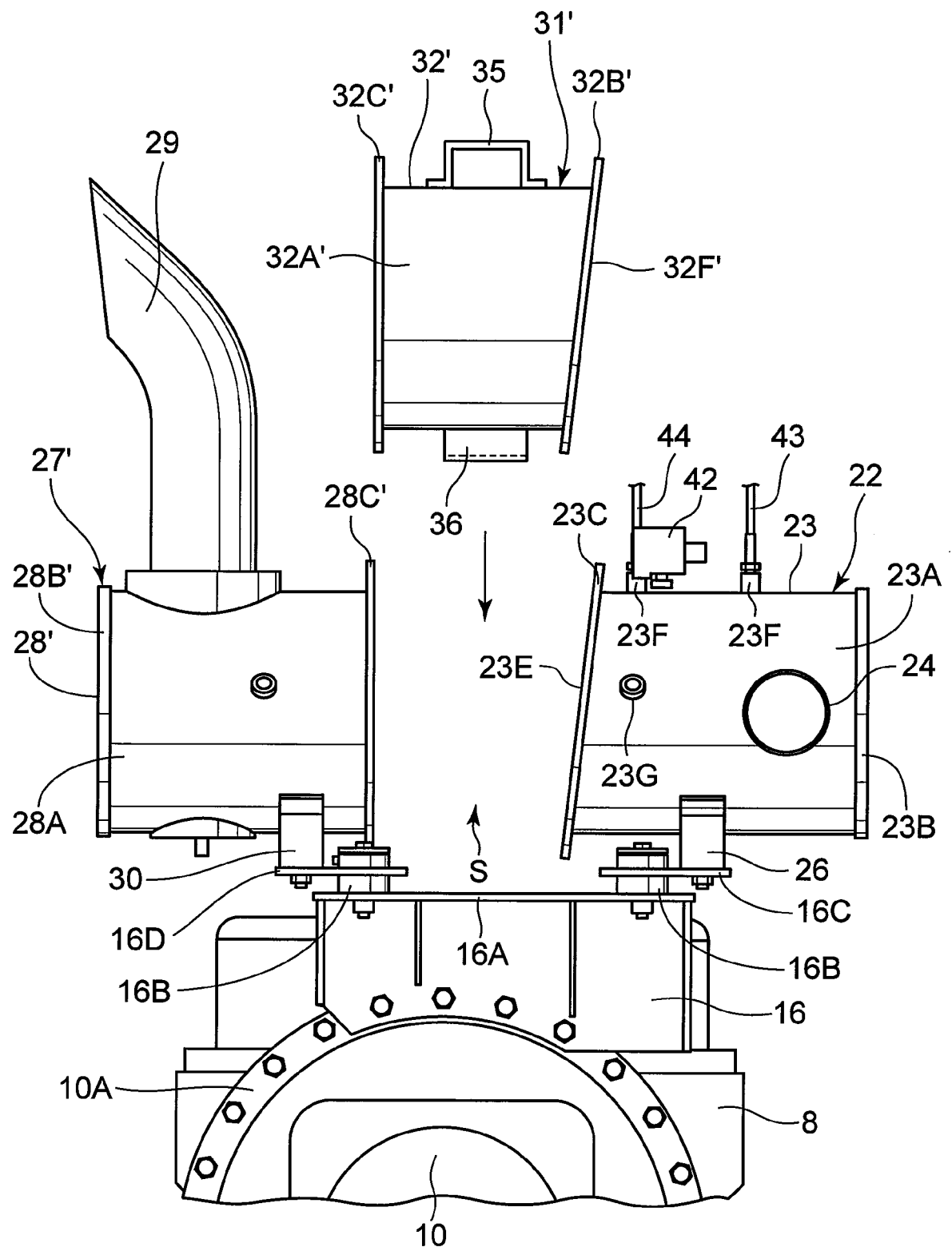
FIG. 17 is a front view similar to FIG. 9 and illustrating the exhaust gas treatment apparatus in accordance with a first modification.

Indicated at 55 is a recessed portion which is provided in an intermediate portion of each positioning pin 54. As shown in FIGS. 14 to 16, the recessed portion 55 is formed by notching an upper surface side of the positioning pin 54 with a substantially U-shaped cross-sectional shape, and is for restricting the gasket 41 from moving in the axial direction of the positioning pin 54. Here, the recessed portion 55 has a rising surface 55A which is located on the distal end side of the positioning pin 54 and extends substantially upward from the bottom and an inclined surface 55B which extends diagonally upward from the bottom toward the cylindrical case 32.

In consequence, as shown in FIG. 14, in the state in which the pin passage hole 41B of the gasket 41 is engaged with the bottom of the recessed portion 55, a peripheral edge portion of the pin passage hole 41B of the gasket 41 abuts against the rising surface 55A of the recessed portion 55, thereby making it possible to prevent the gasket 41 from becoming disengaged from the positioning pin 54. Meanwhile, as shown in FIG. 15, when the gasket 41 is moved to the cylindrical case 32 side, an inner peripheral edge portion of the pin passage hole 41B of the gasket 41 is adapted to move along the inclined surface 55B of the recessed portion 55, thereby making it possible to position the gasket 41 coaxially with the cylindrical case 32.

The exhaust gas treatment apparatus 51 in accordance with the second embodiment has the above-described construction. In this embodiment as well, the substantially V-shaped insertion space S which is gradually enlarged from the lower side toward the upper side is formed between the upwardly inclined connecting surface 23E provided on the flange portion 23C of the upstream cylinder 22 and the upwardly inclined connecting surface 28E provided on the flange portion 28C of the downstream cylinder 27. Accordingly, it is possible to enhance the operational efficiency at the time of mounting and removing the filter accommodating cylinder 31 with respect to the upstream cylinder 22 and the downstream cylinder 27.

As such, the exhaust gas treatment apparatus 51 in accordance with the second embodiment is capable of further enhancing the operational efficiency at the time of mounting the filter accommodating cylinder 31 between the upstream cylinder 22 and the downstream cylinder 27. Hereafter, a description will be given of the operation of mounting the filter accommodating cylinder 31.

Figure 13:
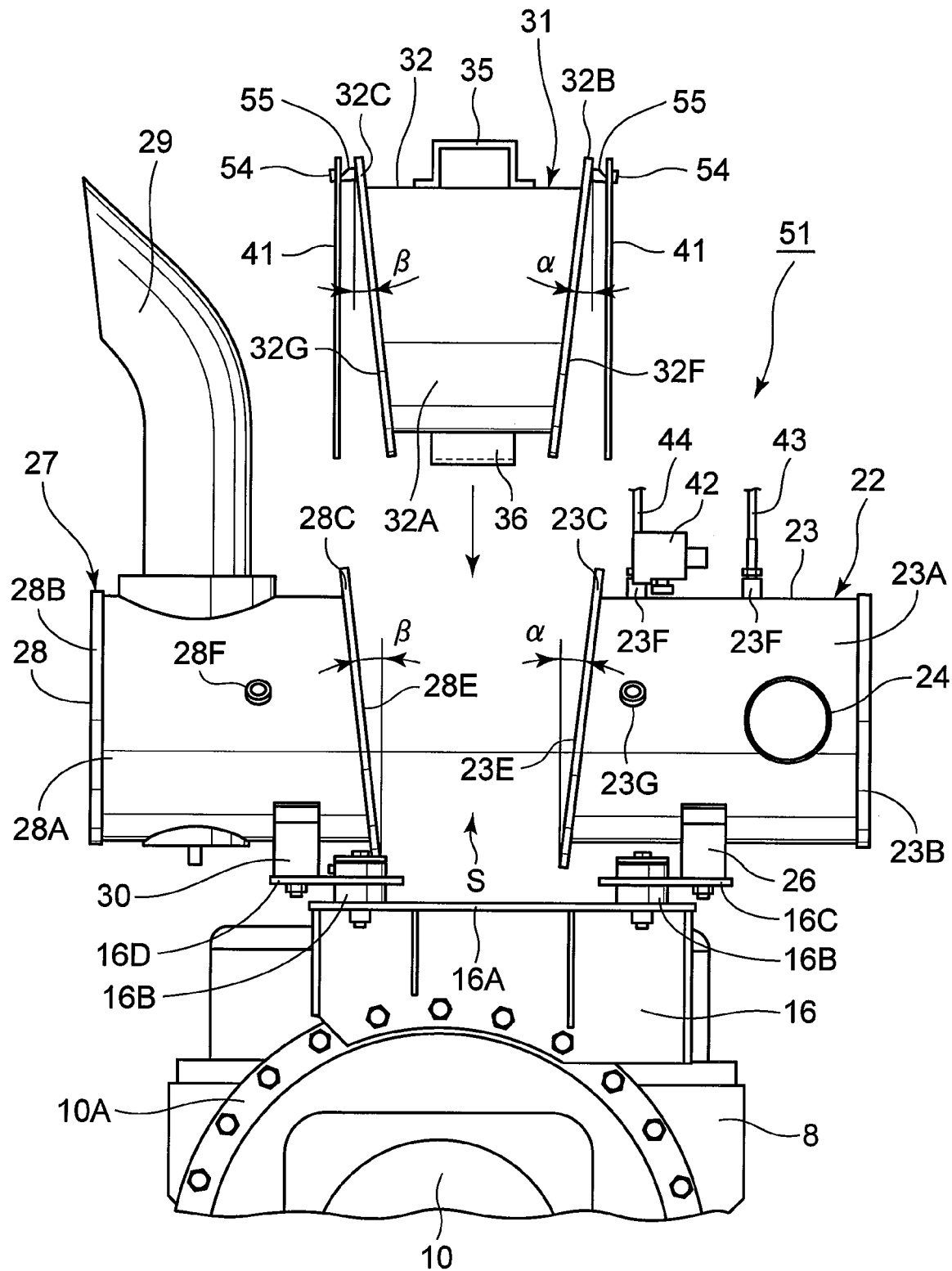
FIG. 13 is a front view illustrating a state of mounting or removing the filter accommodating cylinder with respect to the upstream cylinder and the downstream cylinder.

In the case where the operation of mounting this filter accommodating cylinder 31 is performed, as shown in FIG. 13, the pin passage hole 41B of the gasket 41 is inserted into each positioning pin 54 of the filter accommodating cylinder 31 to temporarily fix the gaskets 41 to the upstream side flange portion 32B and the downstream side flange portion 32C, respectively, of the filter accommodating cylinder 31.

In this state, as the filter accommodating cylinder 31 is inserted between the upstream cylinder 22 and the downstream cylinder 27, the positioning pin 54 provided on the upstream side flange portion 32B of the filter accommodating cylinder 31 is engaged with the notched groove 52 provided in the flange portion 23C of the upstream cylinder 22, as shown in FIGS. 15 and 16. Also, the positioning pin 54 provided on the downstream side flange portion 32C of the filter accommodating cylinder 31 is engaged with the notched groove 53 provided in the flange portion 28C of the downstream cylinder 27. In consequence, the filter accommodating cylinder 31 can be positioned so as to be coaxial with the upstream cylinder 22 and the downstream cylinder 27.

In the state in which the filter accommodating cylinder 31 positioned coaxially with the upstream cylinder 22 and the downstream cylinder 27, the upstream side flange portion 32B of the filter accommodating cylinder 31 and the flange portion 23C of the upstream cylinder 22 are fastened by use of the bolts 33 and the nuts 34. Similarly, the downstream side flange portion 32C of the filter accommodating cylinder 31 and the flange portion 28C of the downstream cylinder 27 are fastened by use of the bolts 33 and the nuts 34. In consequence, the filter accommodating cylinder 31 can be connected in series in the horizontal direction (direction of the axis O-O) between the upstream cylinder 22 and the downstream cylinder 27.

As such, according to the exhaust gas treatment apparatus 51 in accordance with the second embodiment, at the time of mounting the filter accommodating cylinder 31 between the upstream cylinder 22 and the downstream cylinder 27, the positioning pin 54 provided on the upstream side flange portion 32B of the filter accommodating cylinder 31 is engaged with the notched groove 52 of the upstream cylinder 22, and the positioning pin 54 provided on the downstream side flange portion 32C thereof is engaged with the notched groove 53 of the downstream cylinder 27, thereby allowing the filter accommodating cylinder 31 to be positioned so as to be coaxial with the upstream cylinder 22 and the downstream cylinder 27.

For this reason, it is possible to speedily and easily perform such as the maintenance operation including cleaning and repair of the DPF 37 incorporated in this filter accommodating cylinder 31, and the connecting operation of connecting the filter accommodating cylinder 31 between the upstream cylinder 22 and the downstream cylinder 27, making it possible to enhance the operational efficiency thereof.

In addition, the gaskets 41 are arranged to be latched on the positioning pins 54 which are respectively provided on the upstream side flange portion 32B and the downstream side flange portion 32C of the filter accommodating cylinder 31. In consequence, the gaskets 41 can be positioned with respect to the upstream side flange portion 32B and the downstream side flange portion 32C of the filter accommodating cylinder 31, respectively. As a result, the operation of providing the gaskets 41 for the filter accommodating cylinder 31 and the operation of connecting the filter accommodating cylinder 31 to the upstream cylinder 22 and the downstream cylinder 27 can be performed simultaneously, thereby making it possible to further enhance the operational efficiency at the time of mounting the filter accommodating cylinder 31.

It should be noted that, in the above-described first embodiment, the case has been illustrated in which the downwardly inclined connecting surfaces 32F and 32G are respectively provided on the upstream side flange portion 32B and the downstream side flange portion 32C of the filter accommodating cylinder 31, whereas the upwardly inclined connecting surface 23E is provided on the flange portion 23C of the upstream cylinder 22, and the upwardly inclined connecting surface 28E is provided on the flange portion 28C of the downstream cylinder 27.

However, the present invention is not limited to this particular example. For instance, a configuration may be provided in which a filter accommodating cylinder 31' is used as in a first modification shown in FIG. 17.

Namely, the filter accommodating cylinder 31' in accordance with the first modification has a cylindrical case 32' consisting of a cylindrical portion 32A', an upstream side flange portion 32B', a downstream side flange portion 32C', and the like. In this instance, as for the cylindrical case 32', a downwardly inclined connecting surface 32F' is formed only on the upstream side flange portion 32B', and a vertical connecting surface extending in the vertical direction perpendicular to the axis O-O is formed on the downstream side flange portion 32C'. Meanwhile, a downstream cylinder 27' has a cylindrical case 28' consisting of a cylindrical portion 28A', a lid portion 28B', a flange portion 28C', and the like, and a vertical connecting surface extending in the vertical direction is formed on the flange portion 28C'.

The construction may be provided such that when the filter accommodating cylinder 31' is mounted between the upstream cylinder 22 and the downstream cylinder 27', the downwardly inclined connecting surface 32F' of the upstream side flange portion 32B' is abutted against the upwardly inclined connecting surface 23E of the upstream cylinder 22, and the vertical connecting surface of the downstream side flange portion 32C' is abutted against the vertical connecting surface of the flange portion 28C' of the downstream cylinder 27'.

In the above-described embodiments, the filter accommodating cylinder 31 in which the DPF 37 serving as a treatment member is accommodated is used as the purifying part cylinder. However, the present invention is not limited to this particular example. For instance, a configuration may be provided as in a second modification shown in FIG. 18.

Figure 18:
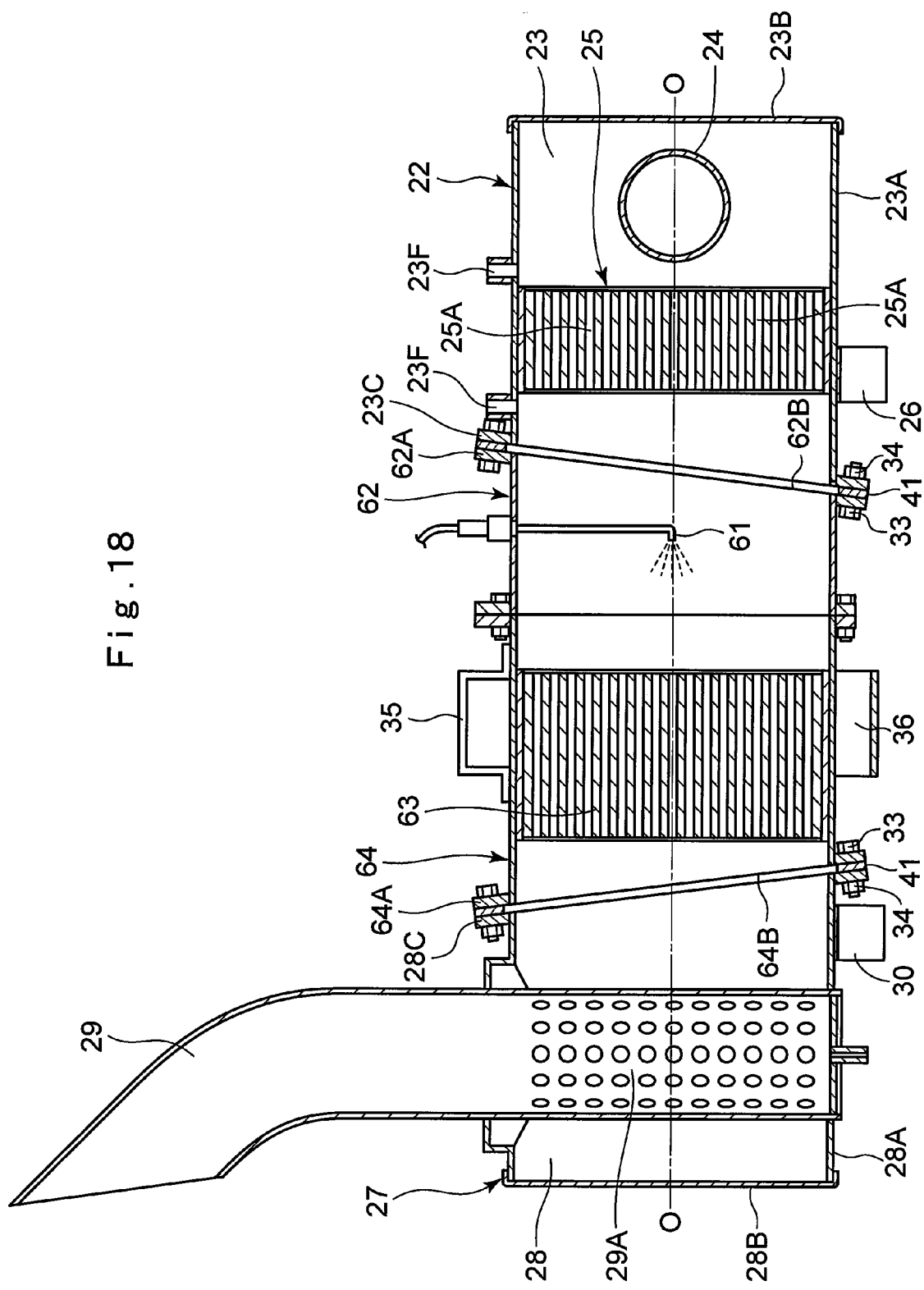
FIG. 18 is a longitudinal sectional view similar to FIG. 6 and illustrating the exhaust gas treatment apparatus in accordance with a second modification.

Namely, as shown in FIG. 18, as the purifying part cylinder, it is possible to adopt a construction in which an injection valve accommodating cylinder 62, which incorporates a urea water injection valve 61 as a treatment member, and a reduction catalyst accommodating cylinder 64, which incorporates a selective reduction catalyst as a treatment member, are connected in series between the upstream cylinder 22 and the downstream cylinder 27. In this instance, a downwardly inclined connecting surface 62B which directly opposes the upwardly inclined connecting surface 23E of the flange portion 23C of the upstream cylinder 22 is provided on an upstream side flange portion 62A of the injection valve accommodating cylinder 62, while a downwardly inclined connecting surface 64B which directly opposes the upwardly inclined connecting surface 28E of the flange portion 28C of the downstream cylinder 27 is provided on a downstream side flange portion 64A of the reduction catalyst accommodating cylinder 64. In consequence, it is possible to enhance the operational efficiency at the time of mounting and removing the purifying part cylinder consisting of the injection valve accommodating cylinder 62 and the reduction catalyst accommodating cylinder 64 with respect to the upstream cylinder 22 and the downstream cylinder 27. In this instance, the injection valve accommodating cylinder 62 and the reduction catalyst accommodating cylinder 64 can also be formed by a single cylinder.

Accordingly, it is possible to enhance the operational efficiency at the time of performing maintenance operation, such as the operation of cleaning deposits due to the crystallization of a urea water solution, and an inspection operation for a defect in the state of injection with respect to the urea water injection valve 61, and the operation of cleaning deposits due to the precipitation of the urea water solution with respect to the selective reduction catalyst 63.

Meanwhile, in the case of the second modification shown in FIG. 18, as the purifying part cylinder, the case has been illustrated in which the injection valve accommodating cylinder 62 and the reduction catalyst accommodating cylinder 64, which are formed by separate units, are connected in series. Still alternatively, it is possible to adopt a construction in which the oxidation catalyst and the particulate matter removing filter (DPF) are integrally incorporated in a purifying part cylinder consisting of a single cylinder.

Furthermore, in the above-described embodiments, a description has been given by citing as an example the case in which the exhaust gas treatment apparatus 21 is installed in the hydraulic excavator 1 equipped with the crawler type lower traveling structure 2. However, the present invention is not limited to this particular example. For instance, a configuration may be provided in which the exhaust gas treatment apparatus 21 is installed in a hydraulic excavator equipped with a wheel type lower traveling structure consisting of tires and the like. In addition to these, the exhaust gas treatment apparatus 21 may be installed extensively in other construction machines such as a dump truck, a hydraulic crane, and the like.

The invention claimed is:

1. An exhaust gas treatment apparatus comprising an upstream cylinder provided in an exhaust gas passage of an engine mounted on a vehicle body, a downstream cylinder provided on a downstream side of said upstream cylinder, and a purifying part cylinder which is provided between said upstream cylinder and said downstream cylinder by being detachably connected in series in a direction of an axis of each of said cylinders and in which a treatment member for effecting purification treatment of exhaust gas is incorporated, said purifying part cylinder is connected in series in a horizontal direction between said upstream cylinder and said downstream cylinder, said exhaust gas treatment apparatus comprising:

said upstream cylinder, said downstream cylinder, and said purifying part cylinder are provided with flange portions having connecting surfaces which are connected in a mutually opposing state, connecting surfaces of said flange portions for connecting said upstream cylinder and said purifying part cylinder and/or connecting surfaces of said flange portions for connecting said downstream cylinder and said purifying part cylinder are formed by inclined connecting surfaces which are inclined diagonally with respect to a direction perpendicular to the direction of the axis of each of said cylinders, at least one of said inclined connecting surfaces provided on said purifying part cylinder is configured to be formed as a downwardly inclined connecting surface which is inclined diagonally downward such that a size of a lower surface side of said purifying part cylinder disposed in a horizontal direction becomes smaller than that of an upper surface side thereof, and said inclined connecting surface provided on at least one of said upstream cylinder and said downstream cylinder is configured to be formed as an upwardly inclined connecting surface which is inclined diagonally upward such that a size of the upper surface side of said upstream cylinder and/or said downstream cylinder disposed in a horizontal direction becomes smaller than that of the lower surface side thereof.

2. An exhaust gas treatment apparatus according to claim 1, wherein said upstream cylinder and said downstream cylinder are arranged to be fixedly mounted in advance so as to set the axis of each of said cylinders in a horizontal direction with respect to said engine and while keeping an insertion space for said purifying part cylinder, and said purifying part cylinder is arranged to be mounted and removed in the direction perpendicular to the direction of the axis of said upstream cylinder and said downstream cylinder.

3. An exhaust gas treatment apparatus according to claim 1, wherein a positioning pin projecting toward said upstream cylinder is provided on an upstream side flange portion of said purifying part cylinder, and another positioning pin projecting toward said downstream cylinder is provided on a downstream side flange portion thereof, and notched grooves for positioning said purifying part cylinder with respect to said upstream cylinder and said downstream cylinder by causing each of said positioning pins to engage therewith are respectively formed in said flange portion of said upstream cylinder and said flange portion of said downstream cylinder.

4. An exhaust gas treatment apparatus according to claim 3, wherein gaskets are respectively provided between said flange portion of said upstream cylinder and said upstream side flange portion of said purifying part cylinder and between said flange portion of said downstream cylinder and said downstream side flange portion of said purifying part cylinder, pin passage holes through which each of said positioning pins is respectively inserted are respectively provided in each of said gaskets, and in a state in which said pin passage hole of each of said gaskets is fitted over each of said positioning pins, each of said positioning pins is adapted to be respectively engaged with said notched groove in said upstream cylinder and said notched groove in said downstream cylinder.

5. An exhaust gas treatment apparatus according to claim 1, wherein said treatment member accommodated in said purifying part cylinder is one or a combination of plural pieces of a particulate matter removing filter, an oxidation catalyst, a urea water injection valve, and a selective reduction catalyst.

6. An exhaust gas treatment apparatus according to claim 1, wherein said purifying part cylinder is provided with a placing leg for keeping said purifying part cylinder in a properly placed condition when said purifying part cylinder is removed from between said upstream cylinder and said downstream cylinder and is placed on another location.

7. An exhaust gas treatment apparatus according to claim 1, wherein said purifying part cylinder is provided with a grip portion for gripping when said purifying part cylinder is lifted up as a single unit.

8. An exhaust gas treatment apparatus according to claim 1, wherein a support leg for mounting through a vibration isolating member to a treatment apparatus supporting bracket provided on said engine is provided on a lower surface side of said upstream cylinder and said downstream cylinder.

* * * * *